US010154186B2

(12) United States Patent
Kang et al.

(10) Patent No.: US 10,154,186 B2
(45) Date of Patent: Dec. 11, 2018

(54) MOBILE TERMINAL AND METHOD FOR CONTROLLING THE SAME

(71) Applicant: LG ELECTRONICS INC., Seoul (KR)

(72) Inventors: Raehoon Kang, Seoul (KR); Moonjung Kim, Seoul (KR); Hyomin Eum, Seoul (KR); Seongeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 14/986,017

(22) Filed: Dec. 31, 2015

(65) Prior Publication Data
US 2017/0013179 A1    Jan. 12, 2017

(30) Foreign Application Priority Data

Jul. 8, 2015    (KR) .......................... 10-2015-0097362

(51) Int. Cl.
*H04M 1/00*    (2006.01)
*H04N 5/225*    (2006.01)
*H04N 5/232*    (2006.01)
*H04N 5/247*    (2006.01)
*G06F 3/0488*    (2013.01)

(52) U.S. Cl.
CPC ....... *H04N 5/2258* (2013.01); *G06F 3/04883* (2013.01); *H04N 5/2259* (2013.01); *H04N 5/23212* (2013.01); *H04N 5/23216* (2013.01); *H04N 5/23293* (2013.01); *H04N 5/23296* (2013.01); *H04N 5/247* (2013.01)

(58) Field of Classification Search
CPC .............. H04N 5/2258; H04N 5/2259; H04N 5/23212; H04N 5/23216; H04N 5/23293; H04N 5/23296; H04N 5/247; G06F 3/04883; H04M 2250/52
See application file for complete search history.

(56) References Cited

U.S. PATENT DOCUMENTS

| 2010/0315525 | A1* | 12/2010 | Ikeda | G03B 17/18 |
| | | | | 348/222.1 |
| 2011/0115893 | A1* | 5/2011 | Hayashi | H04N 7/181 |
| | | | | 348/77 |
| 2012/0300051 | A1 | 11/2012 | Daigo et al. | |
| 2012/0306786 | A1* | 12/2012 | Bang | G06F 3/04883 |
| | | | | 345/173 |

(Continued)

FOREIGN PATENT DOCUMENTS

JP    2009-244369 A    10/2009

*Primary Examiner* — Barry W Taylor
(74) *Attorney, Agent, or Firm* — Birch, Stewart, Kolasch & Birch, LLP

(57) ABSTRACT

A mobile terminal including a first camera on a front surface of the mobile terminal and configured to capture images at a first angle of view; a second camera on the front surface of the mobile terminal and configured to capture images at a second angle of view different from the first angle of view; a display; and a controller configured to display at least a first image with the first angle of view from the first camera, and display a second image with the second angle of view from the second camera, in response to a request to obtain the second image from the second camera instead of obtaining the first image from the first camera.

20 Claims, 22 Drawing Sheets

(56) References Cited

U.S. PATENT DOCUMENTS

| | | | |
|---|---|---|---|
| 2014/0240540 A1* | 8/2014 | Kim | H04N 5/2258 348/231.99 |
| 2014/0354845 A1* | 12/2014 | Molgaard | H04N 1/215 348/222.1 |
| 2015/0015741 A1 | 1/2015 | Kim et al. | |
| 2015/0215576 A1* | 7/2015 | Pavlov | H04N 7/147 348/14.03 |
| 2015/0249785 A1* | 9/2015 | Mehta | H04N 5/23238 348/36 |
| 2016/0057363 A1* | 2/2016 | Posa | H04N 5/272 348/239 |
| 2016/0316147 A1* | 10/2016 | Bernstein | H04N 5/23293 |

* cited by examiner

FIG. 6A
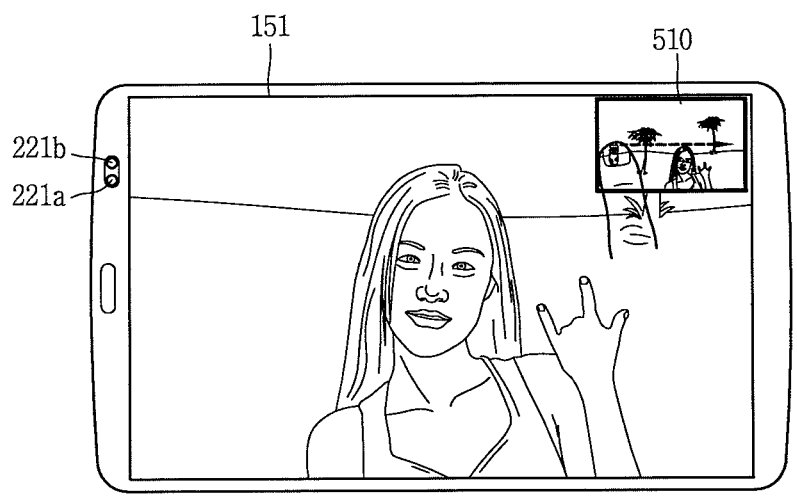
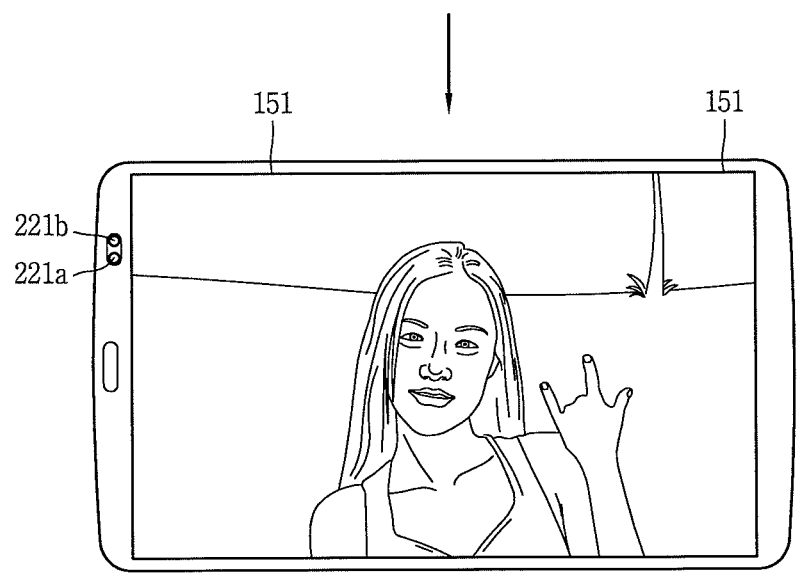

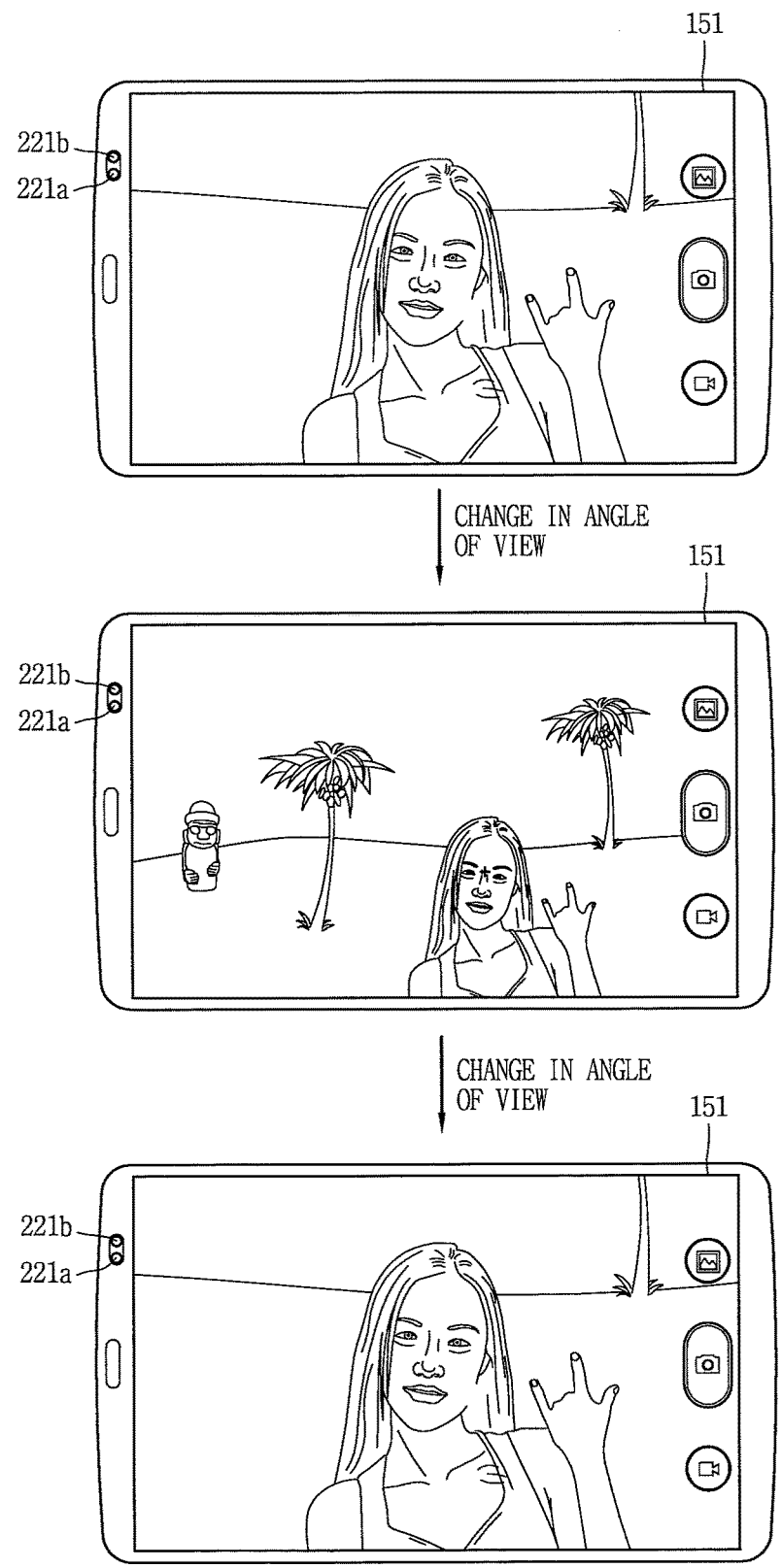

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2015-0097362, filed on Jul. 8, 2015, the contents of which is incorporated by reference herein in its entirety.

BACKGROUND OF THE INVENTION

1. Field of the Invention

The present invention relates to a mobile terminal which provides an image capturing function and a method of controlling the same.

2. Description of the Conventional Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

Recently, users' demands for capturing images with camera-equipped mobile terminals are growing. In line with this, a variety of camera-related structural parts and/or software parts are being developed. As part of the development, mobile terminals equipped with at least two or more cameras with different angles of view are under development. Thus, there is a need to develop various methods for capturing images using at least two cameras.

SUMMARY OF THE INVENTION

The present invention has been made in an effort to solve the aforementioned problems, and an aspect of the present invention is to provide a method of capturing images through at least two cameras with different angles of view.

One exemplary embodiment of the present invention provides a mobile terminal which is configured to capture images, the mobile terminal including: a first camera configured to capture images at a first angle of view and with a first focal point; a second camera configured to capture images at a second angle of view, which is different from the first angle of view, and with a second focal point, which is different from the first focal point; a display that displays at least either a first image received from the first camera and a second image received from the second camera; and a controller that controls the second camera to receive images from the second camera, based on a user request to capture images through the second camera, which is received during reception of an image with a first focal point from the first camera, wherein the controller controls the second camera so that the second camera captures the second image with the second focal point.

Another exemplary embodiment of the present invention provides a mobile terminal including: a first camera for capturing images at a first focal length; a second camera for capturing images at a second focal length, which is different from the first focal length; a display for displaying at least either a first image received from the first camera or a second image received from the second camera; and a controller that controls the first camera to capture at least part of the second image through the first camera, wherein the controller captures the images received from the first and second cameras at the same time, in response to a capture request received from the user.

Still another exemplary embodiment of the present invention provides a method of controlling a mobile terminal, the method including: setting a first camera as a main camera to receive images with a first focal point from the first camera, the first camera being configured to capture images at a first angle of view; receiving a user request for capturing images through a second camera, with the first camera set as the main camera, the second camera being configured to capture images at a second angle of view, which is wider than the first angle of view; and switching the main camera from the first camera to the second camera in response to the user request to receive images through the second camera, wherein, in the switching of the main camera to the second camera, the second camera is controlled to capture images with a second focal point.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 9A to 12 are conceptual diagrams showing a method of capturing images through first and second cameras.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
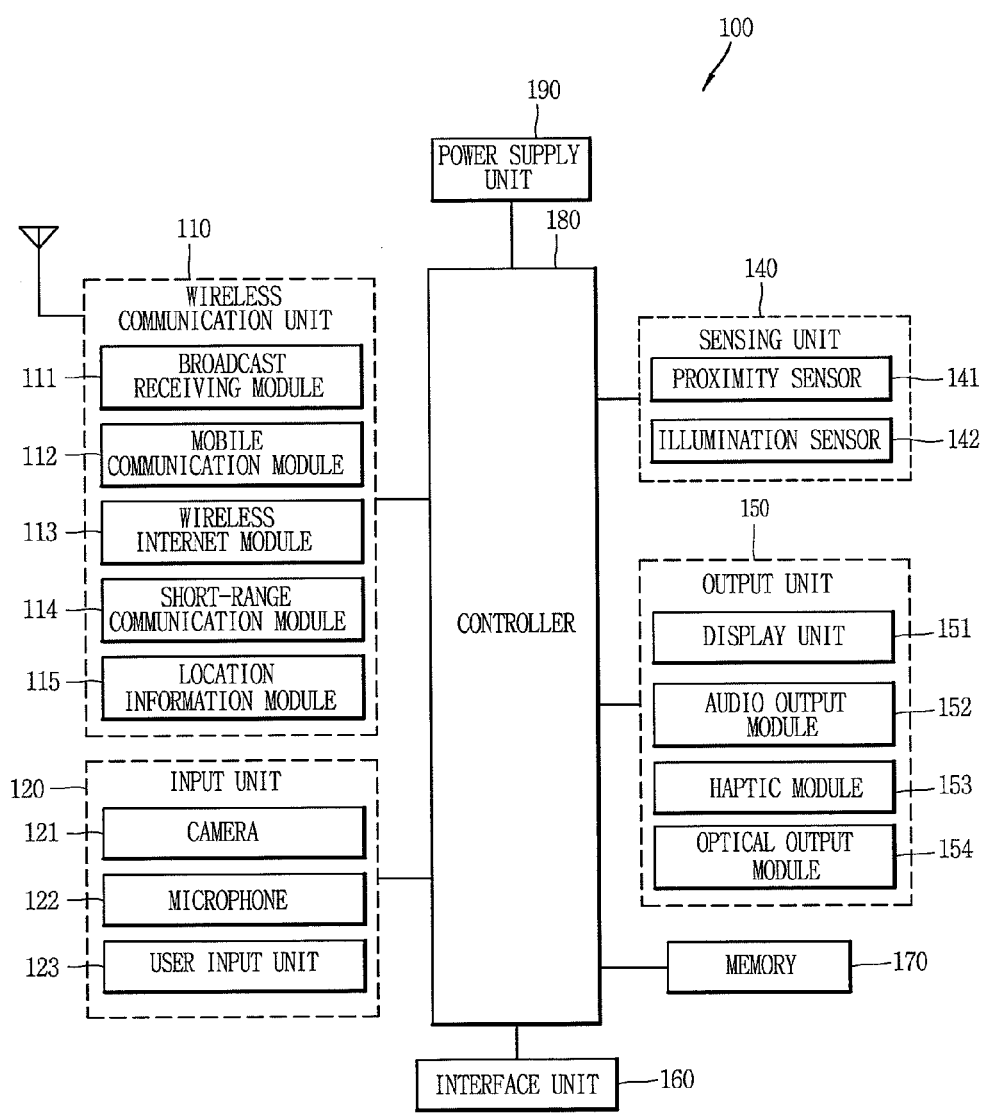
FIG. 1A is a block diagram showing a mobile terminal related to the present invention.
Figure 1B:
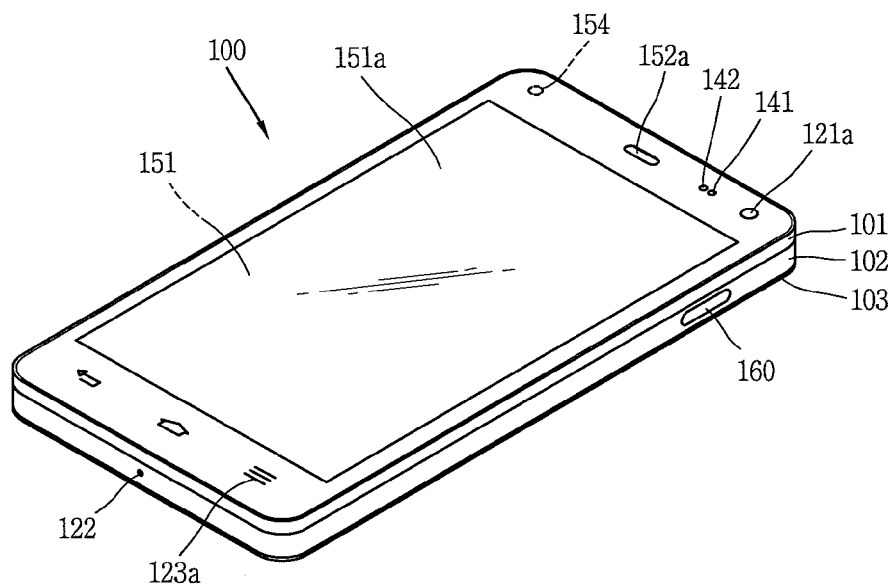
FIGS. 1B and 1C are conceptual diagrams of an example of the mobile terminal related to the present invention when viewed from different directions.
Figure 1C:
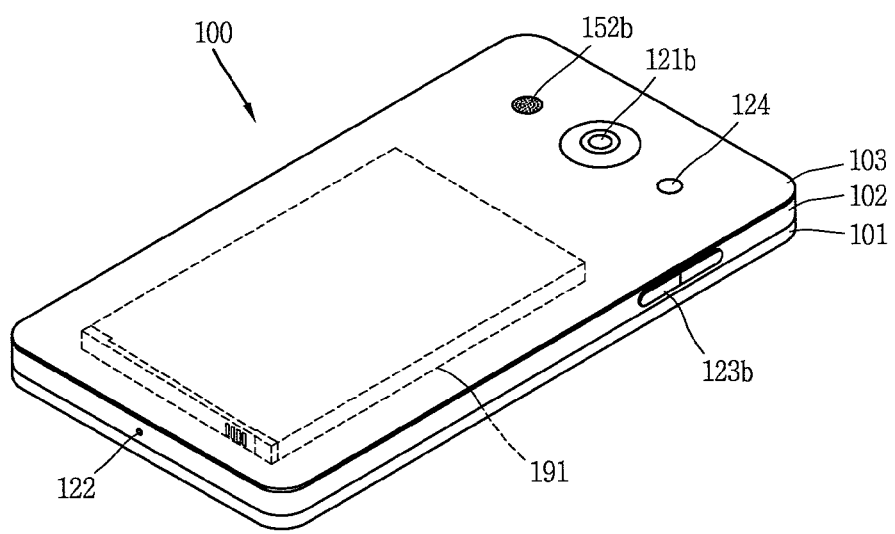

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 121, which is one type of audio input device for inputting an audio signal, and a user input unit 122 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 121, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 122 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body. At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal 100 based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be movable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
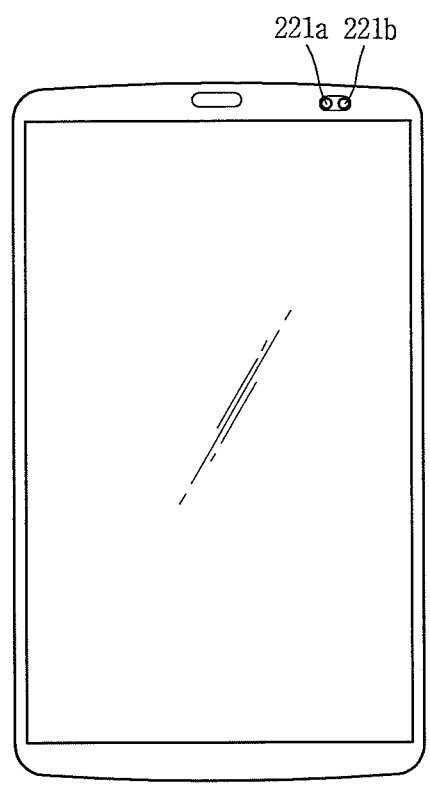
FIG. 1D is a view showing the front side of the mobile terminal related to the present invention.

FIG. 1D is a view showing the front side of the mobile terminal related to the present invention. The mobile terminal according to an embodiment of the present invention may be equipped with at least two cameras that capture images at different angles of view. The angle of view is the extent of a scene that is imaged by a lens equipped in a camera. The wider the camera's angle of view, the wider the extent of a scene that the camera can image.

The wider the camera lens's angle of view, the shorter the focal length. Thus, the camera can shoot a scene in a wide angle if it uses a lens with a wide angle of view. However, the scene in the wide angle is highly distorted due to the angle of view, thus exaggerating the perspective.

The lens may be categorized as a wide-angle lens, a standard lens, or a telephoto lens depending on the angle of view. The standard lens is a lens with 45 degrees angle of view and 50 mm focal length. Lenses with an angle of view more than 45 degrees may be classified as wide-angle lenses, and lenses with an angle of view less than 45 degrees may be classified as telephoto lenses.

The mobile terminal may be equipped with at least two cameras on at least one of the front, sides, and back of the main body to capture images at different angles of view. For example, as shown in FIG. 1D, the mobile terminal may have two cameras 221*a* and 221*b* with different angles of view located adjacent to each other on the front side of the main body. The two cameras 221*a* and 221*b* with different angles of view may capture images in the same direction.

In the present invention, two cameras with different angles of view may be located on the back or one side of the main body, apart from the front. Also, at least two cameras may be located on two of the front, sides, and back of the main body so that the mobile terminal may capture images in different directions.

Although a method of receiving images from two cameras with different angles of view will be described below as a typical example, the present invention may be equally applicable to two or more cameras. Also, although the present invention has been made with respect to two cameras, it may be equally applicable to one camera having two lenses with different angles of view.

Figure 2:
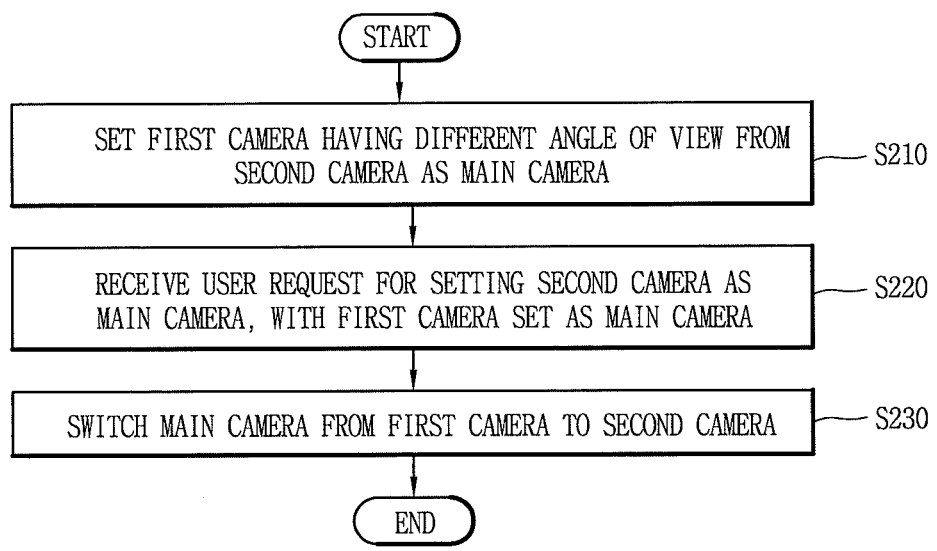
FIG. 2 is a flowchart showing a method of capturing images through at least two cameras with different angles of view.
Figure 3A:
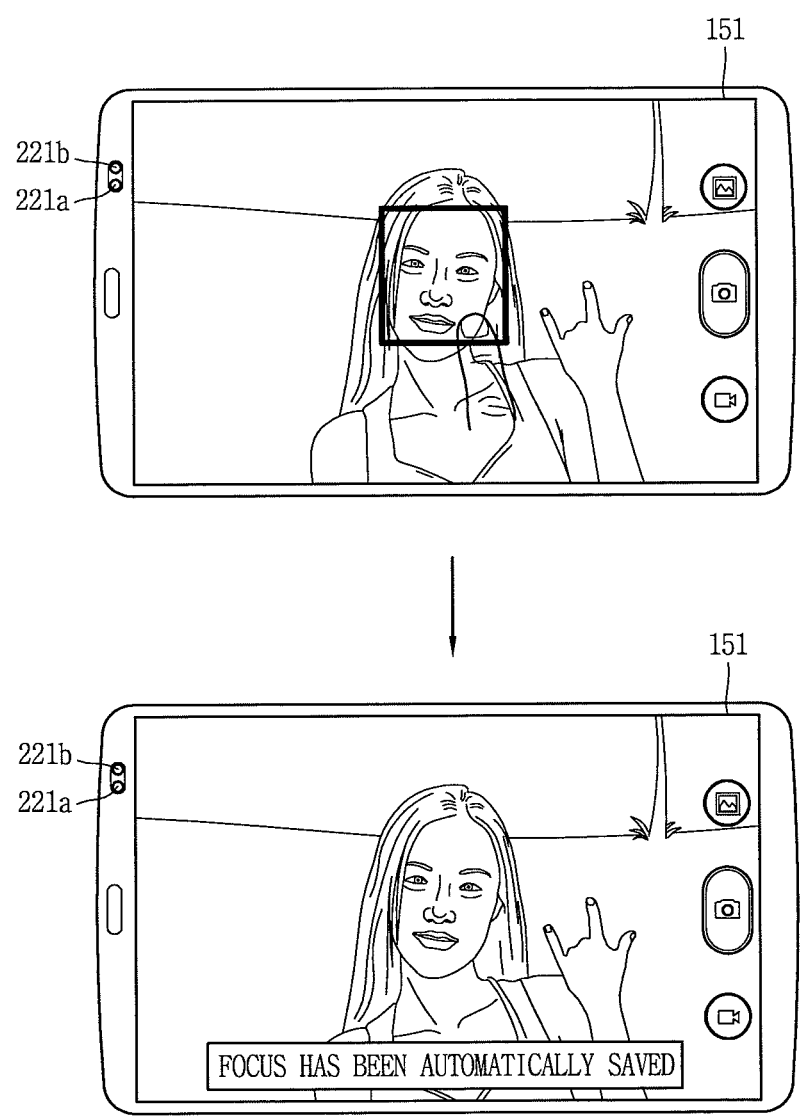
FIGS. 3A, 3B, and 3C are conceptual diagrams showing the control method of FIG. 2.
Figure 3B:
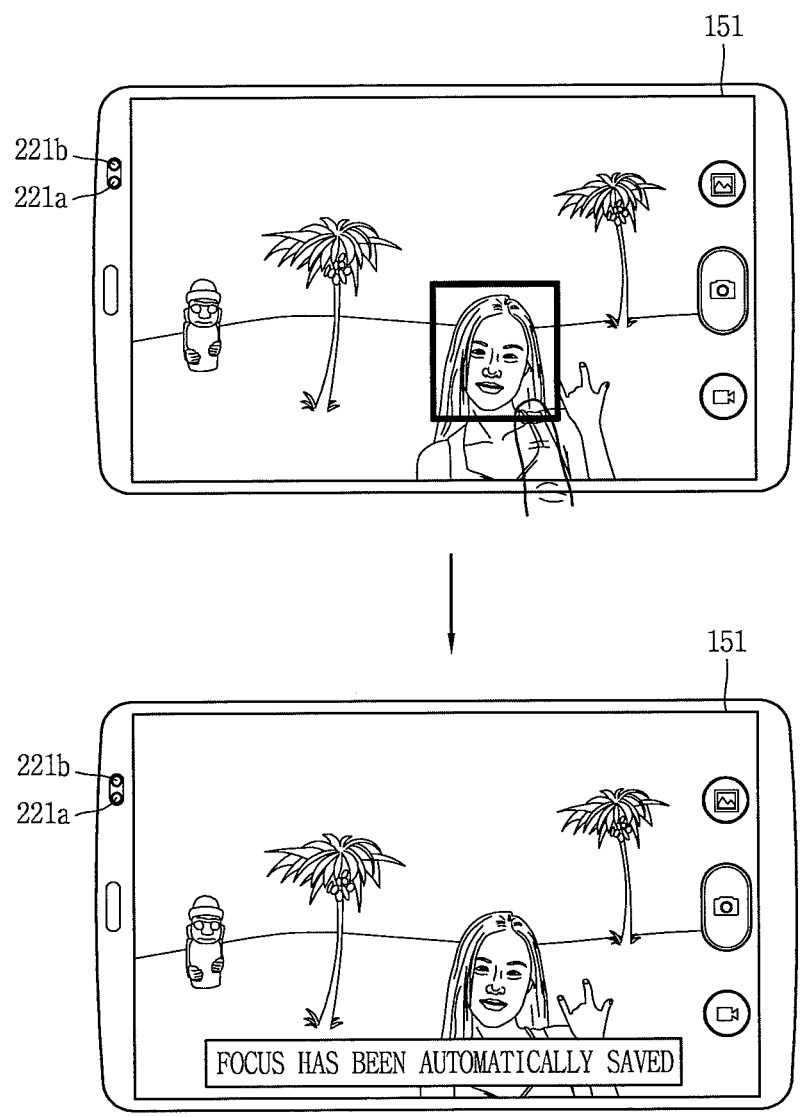
Figure 3C:
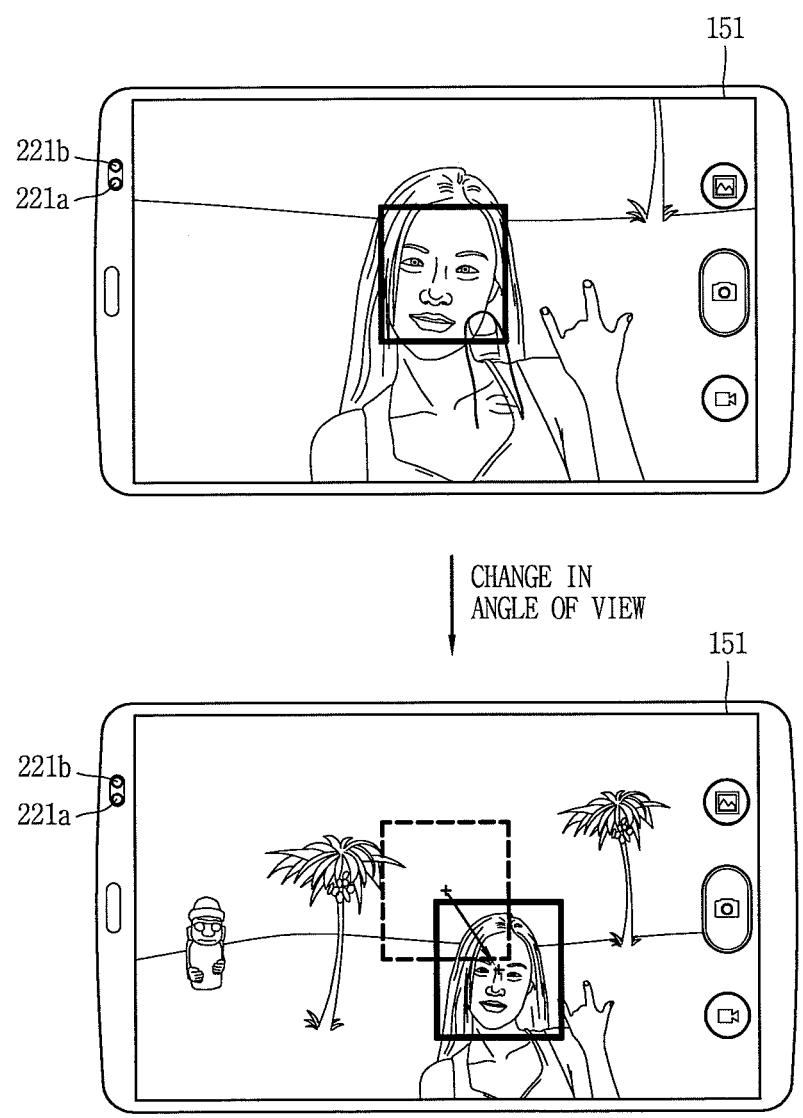

In the following description, cameras that capture images at a first angle of view and a second angle of view are termed a first camera 221*a* and a second camera 221*b*, respectively, and the first and second cameras may be collectively termed a camera 221. Hereinafter, a method of capturing images through at least two cameras with different angles of view will be described. FIG. 2 is a flowchart showing a method of capturing images through at least two cameras with different angles of view, and FIGS. 3A, 3B, and 3C are conceptual diagrams illustrating explaining the control method of FIG. 2.

A mobile terminal according to an embodiment of the present invention includes at least two cameras 221*a* and 221*b* on at least one of the front, sides, and back of the main body. For example, two cameras 221*a* and 221*b* may be located adjacent to each other on the front side of the main body.

The at least two cameras 221*a* and 221*b* may have different angles of view. For example, the first camera 221*a* may capture images at a first angle of view, and the second camera 221*b* may capture images at a second angle of view, which is wider than the first angle of view. The first camera 221*a* may be termed a normal camera equipped with a standard lens, and the second camera 221*b* may be termed a wide-angle camera equipped with a wide-angle lens.

The controller 180 of the mobile terminal can receive images from at least one of the first and second cameras 221*a* and 221*b*. For example, the controller 180 can receive images from the first camera 221*a*. To receive images from a camera, the controller 180 can activate the camera. Activating the camera 121 corresponds to setting the camera 121 to receive a subject's image from the camera 121. In contrast, deactivating the camera 121 corresponds to setting the camera 121 to not receive a subject's image from the camera 121.

Also, the controller 180 can set either the first camera 221*a* or the second camera 221*b* as a main camera and the other camera as a sub camera. The main camera may represent a camera capable of capturing images received from cameras, and the sub camera may represent a camera incapable of capturing images received from cameras.

Hereinafter, a method of switching the first and second cameras 221*a* and 221*b* from either the main camera mode or the sub-camera mode to the other camera mode will be described in more details. First, the controller 180 can set a first camera, which has a different angle of view from a second camera and capture images with a first focal point, as a main camera (S210).

The controller 180 can receive images from at least one of the first and second cameras 221a and 221b. In this instance, the controller 180 can select at least one of the first and second cameras 221a and 221b as the main camera, based on a user request.

The user request may be received from at least one among touch input, voice input, and gesture input. In this instance, the controller 180 can control the at least one selected from among the first and second cameras 221a and 221b to capture an image received from it. For example, if the main camera is the first camera 221a, the controller 180 can switch the main camera to the second camera 221b based on a touch on a graphical object for camera switching, which is displayed overlapping an image received from the first camera 221a, while the received image is displayed on the display 151.

Also, the controller 180 can display an image received from the selected camera on the display 151. For example, if the first camera 221a is selected, the controller 180 can set the first camera 221a as the main camera and display a first image received from the first camera 221a on the display 151 to capture the first image. The other camera may be set as the sub camera. In this instance, the controller 180 can control the display 151 so that an image received from the sub camera is not displayed on the display 151.

In addition, if at least one of the first and second cameras 221a and 221b is set as the main camera, the controller 180 can activate the first and second cameras 221a and 221b so that images received from the first and second cameras 221a and 221b have a preset focal point. The preset focal point may be a focal point that is set in advance for each camera before the activation of the first and second cameras 221a and 221b. For example, when activating the first camera 221a, the controller 180 can activate the first camera 221a to have a first focal point.

The focal point denotes the focal point of a lens equipped in a camera. The lens' focal point denotes a point that light incident in parallel to the optical axis of the lens passes through. The lens' focal point may determine the sharpness of an image. Normally, if light reflected on a subject passes through the focal point when capturing images through the camera, sharp images can be acquired. If the light reflected on the subject does not pass through the focal point, a blurred image may be acquired. Thus, the lens' focal point may be construed as having the same meaning as an image's focal point.

A focal point preset for the first and second cameras 221a and 221b may be set based on the user's selection or a preset algorithm. For example, the preset focal point may be set based on the user's selection. More specifically, as in the first drawing of FIG. 3A, the controller 180 can display a first image received from the first camera 221a on the display 151.

The controller 180 can sense a preset type of touch on the display 151 while the first image is displayed. For example, the preset type of touch may be a long touch. As shown in the second drawing of FIG. 3A, the controller 180 can set the first camera 221a to a focal point corresponding to the long-touched area.

The controller 180 can likewise set the focal point of the second camera 221b. For example, as shown in FIG. 3B, if a second image received from the second camera 221b is touched long while the second image is displayed on the display 151, the controller 180 can set the second camera 221b to a focal point corresponding to the image displayed in the long-touched area. In another example, the controller 180 can set focal points based on a preset algorithm such as a focal point detection algorithm. For instance, the preset algorithm may be a contrast detection algorithm or a phase difference detection algorithm.

Once the focal points are set, the controller 180 can store in the memory 170 the first focal point for the first camera 221a and the second focal point for the second camera 221b. Thereafter, when receiving images from the first and second cameras 221a and 221b, the controller 180 can activate the first and second cameras 221a and 221b so as receive images having the first and second focal points immediately from the first and second cameras 221a and 221b, without detecting the focal points.

With the first camera 221a set as the main camera, the controller 180 can receive a user request for setting the second camera 221b as the main camera (S220). With the first camera 221a set as the main camera, the controller 180 can display a first image having a first focal point received from the first camera 221a on the display 151.

While the first image is displayed, the controller 180 can receive a user request for setting the second camera 221b as the main camera. The user request may be received in various ways, and a concrete example thereof will be given with reference to FIGS. 4 to 8. Upon receiving a user request for setting the second camera 221b as the main camera, the controller 180 can switch the main camera from the first camera 221a to the second camera 221b (S230).

The controller 180 can set the second camera 221b as the main camera, in response to the user request for setting the second camera 221b as the main camera. That is, the controller 180 can switch the second camera 221b from the sub camera to the main camera.

The first camera 221a and the second camera 221b may have different focal points because they have different angles of view. In this instance, the controller 180 has to change the focal point of images when switching the main camera from the first camera 221a to the second camera 221b. That is, the controller 180 always has to change the focal point each time it switches the main camera. Thus, it may take a longer time to detect the focal point.

To reduce the time taken to detect the focal point, the present invention provides a preset focal point when switching the main camera. More specifically, when the second camera 221b is set as the main camera, the controller 180 can activate the second camera 221b and receive images from the second camera 221b. In this instance, the controller 180 can activate the second camera 221b so that the images received from the second camera 221b have a second focal point. The second focal point is a preset focal point. That is, when activating the second camera 221b, the controller 180 can activate the second camera 221b to have a preset focal point immediately, without an additional process of setting a focal point for the images received from the second camera 221b.

For example, as shown in FIG. 3C, upon receiving a request for capturing through the second camera 221b while receiving a first image having a first focal point from the first camera 221a, the controller 180 can receive a second image having a second focal point from the second camera 221b. In this instance, as shown in FIG. 3C, the controller 180 can display the image having the second focal point on the display 151.

As such, when receiving an image from at least one of the first and second cameras 221a and 221b, the controller 180 can receive an image having a preset focal point immediately, without a focal point detection process. That is, the present invention allows for saving the time needed for detecting the focal point of an image by using a preset focal point, instead of setting a focal point. In the above, the method of switching between first and second cameras having different angles of view has been described. As such, the present invention allows for quick switching between first and second cameras having different angles of view.

Hereinafter, a method of switching the main camera between at least two cameras will be described, in order to capture images through the at least two cameras configured to capture images with different angles of view. In particular, FIGS. 4 to 8 are conceptual diagrams showing a method of switching the main camera between at least two cameras having different angles of view, in order to capture images through the at least two cameras.

A mobile terminal according to an embodiment of the present invention can capture images through at least one of first and second cameras 221a and 221b having different angles of view. In this instance, the controller 180 can control the at least two cameras to receive images from at least one of the first and second cameras 221a and 221b. For example, the controller 180 can control the first and second cameras 221a and 221b to receive images from the first camera 221a but not from the second camera 221b. In another example, the controller 180 can control the first and second cameras 221a and 221b to receive images from both of the first and second cameras 221a and 221b.

Also, the controller 180 can display images received from at least one of the first and second cameras 221a and 221b on the display 151. For example, if the controller 180 receives images from the first camera 221a but not from the second camera 221b, the controller 180 can display only a first image received from the first camera 221a on the display 151. In another example, if the controller 180 receives images from both of the first and second cameras 221a and 221b, the controller 180 can display the images received from the first and second cameras 221a and 221b together on the display 151.

The controller 180 can display the images received from the first and second cameras 221a and 221b together in various ways. For example, the controller 180 can split up the display 151 into two and display a first image in a first area and a second image in a second area. The first and second areas may be of the same size or different sizes. In another example, the controller 180 can display a first image in the entire output area of the display 151 and then a thumbnail image of a second image over the first image in an overlapping manner. Displaying images overlapping each other is referred to as PIP (Picture in Picture).

With the first camera 221a set as the main camera, the controller 180 can switch the main camera from the first camera 221a to the second camera 221b to capture images received from the second camera 221 based on a user request or a preset condition. The user request may be received by at least one of the following: touch input, voice input, and gesture input. More specifically, the controller 180 can switch the main camera from any one of the first and second cameras 221a and 221b to the other camera, depending on the type of touch on an image displayed on the display 151.

Figure 4:
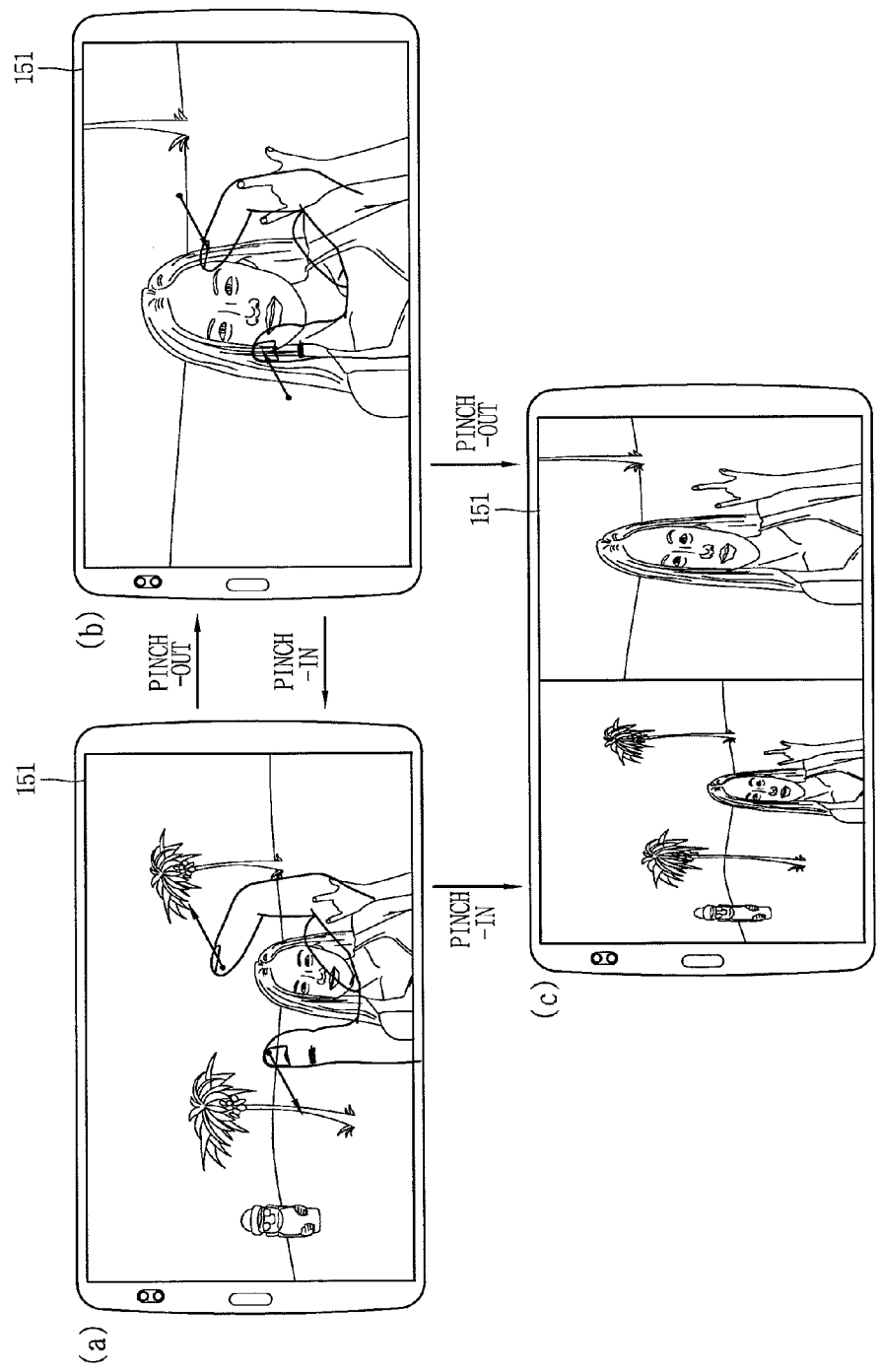
FIGS. 4 to 8 are conceptual diagrams showing a method of switching the main camera between at least two cameras having different angles of view, in order to capture images through the at least two cameras.

For example, as shown in FIG. 4, the controller 180 can switch the main camera between the first camera and the second camera, based on a pinch-in or pinch-out gesture. More specifically, as shown in (a) of FIG. 4, the controller 180 can display a second image received from the second camera 221b on the display 151. In this instance, the controller 180 can switch the main camera from the second camera 221b to the first camera 221a to capture an image received from the first camera 221a, in response to a pinch-out gesture on the second image. Also, the second camera 221b can be switched from the main camera to the sub camera.

In this instance, as shown in (b) of FIG. 4, the controller 180 can display a first image received from the first camera 221a on the display 151 and stop displaying the second image from the display 151. Also, as shown in (a) and (b) of FIG. 4, while the second image is displayed on the display 151, the controller 180 can set both the first and second cameras 221a and 221b as the main camera to capture the images received from the first and second cameras 221a and 221b altogether in response to a pinch-in gesture. In this instance, as shown in (c) of FIG. 4, the first and second images may be displayed together on the display 151.

The controller 180 can execute different functions for different images to which a preset type of touch is applied. More specifically, if a preset type of touch is applied to the first image, the controller 180 can execute a first function, and if a preset type of touch is applied to the second image, the controller 180 can execute a second function.

For example, as shown in (b) of FIG. 4, if a pinch-in gesture (or touch) is performed on the first image while the first image is displayed on the display 151, the controller 180 can switch the main camera from the first camera 221a to the second camera 221b to receive the second image through the second camera 221b. Also, the second camera 221b may be switched from the main camera to the sub camera.

In this instance, as shown in (a) of FIG. 4, the display 151 may display not the first image but the second image. That is, unlike what has been explained previously, if a pinch-in gesture is performed on the first image, the controller 180 can display only the second image received from the second camera 221b, and if a pinch-in gesture is performed on the second image, the controller 180 can display the first and second images received from the first and second cameras 221a and 221b together.

Also, as shown in (b) and (c) of FIG. 4, if a pinch-out gesture is performed on the first image while the first image is displayed on the display 151, the controller 180 can set both the first and second cameras 221a and 221b as the main camera to capture the images received from the first and second cameras 221a and 221b altogether. In this instance, the controller 180 can display both the first image and the second image on the display 151.

When performing a camera switching function by a pinch-in gesture or pinch-out gesture, the controller 180 can control not to zoom in or out on the images in response to the pinch-in gesture or pinch-out gesture. As such, the present invention makes it easy to switch between two cameras by performing a pinch-in gesture or pinch-out gesture on the display 151. Also, the present invention allows the user to switch between cameras more intuitively by executing different functions depending on the type of image touched.

Alternatively, the controller 180 can switch the main camera from any one of the first and second cameras 221a and 221b to the other camera by using thumbnail images of the images received from the first and second cameras 221a and 221b. For example, when the first camera 221a is set as the main camera and the second camera 221b is set as the sub-camera, the first camera 221a may be activated to receive a first image from the first camera 221a.

Figure 5A:
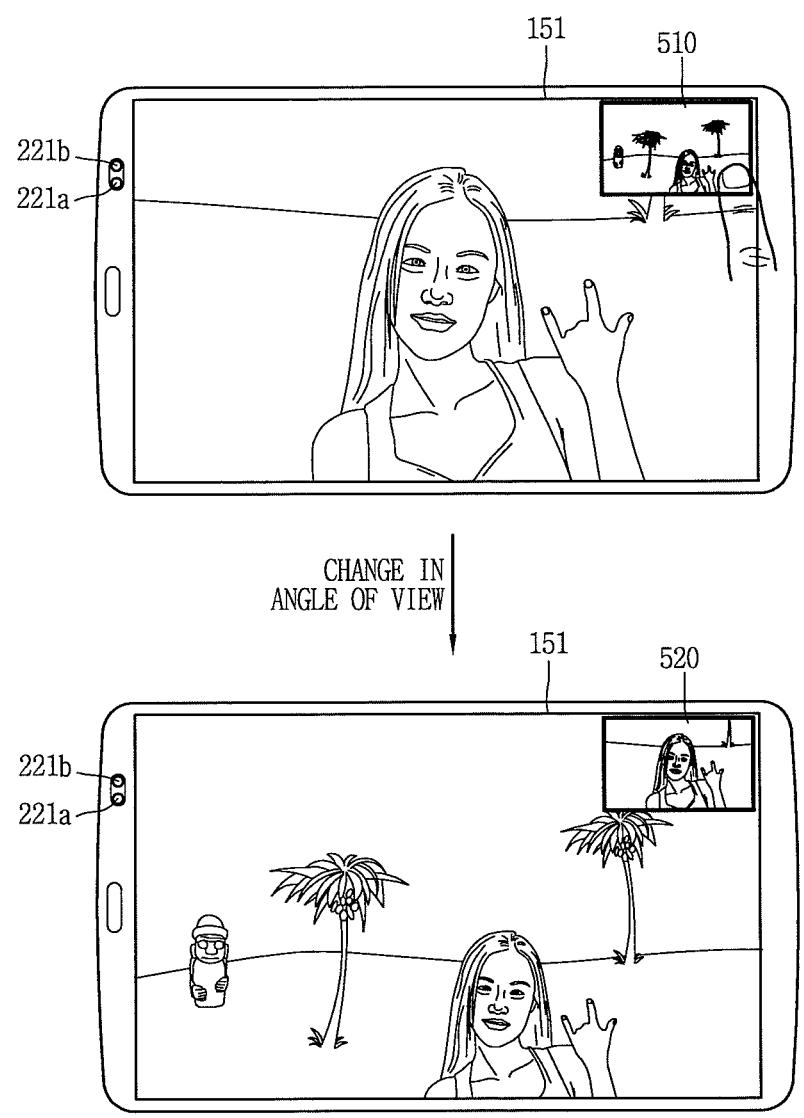

In this instance, as shown in the first drawing of FIG. 5A, the controller 180 can display the first image received from the first camera 221a and a thumbnail image 510 of a second image received from the second camera 221b together on the display 151. The thumbnail image 510 is a representative image, which may represent an image received in real time from the second camera 221b.

While these images are displayed, the controller 180 can sense a touch on the thumbnail image 510. In this instance, the controller 180 can switch the main camera from the first camera 221a to the second camera 221b. That is, the first camera 221a may be switched from the main camera to the sub camera, and the second camera 221b may be switched from the sub camera to the main camera.

Figure 5B:
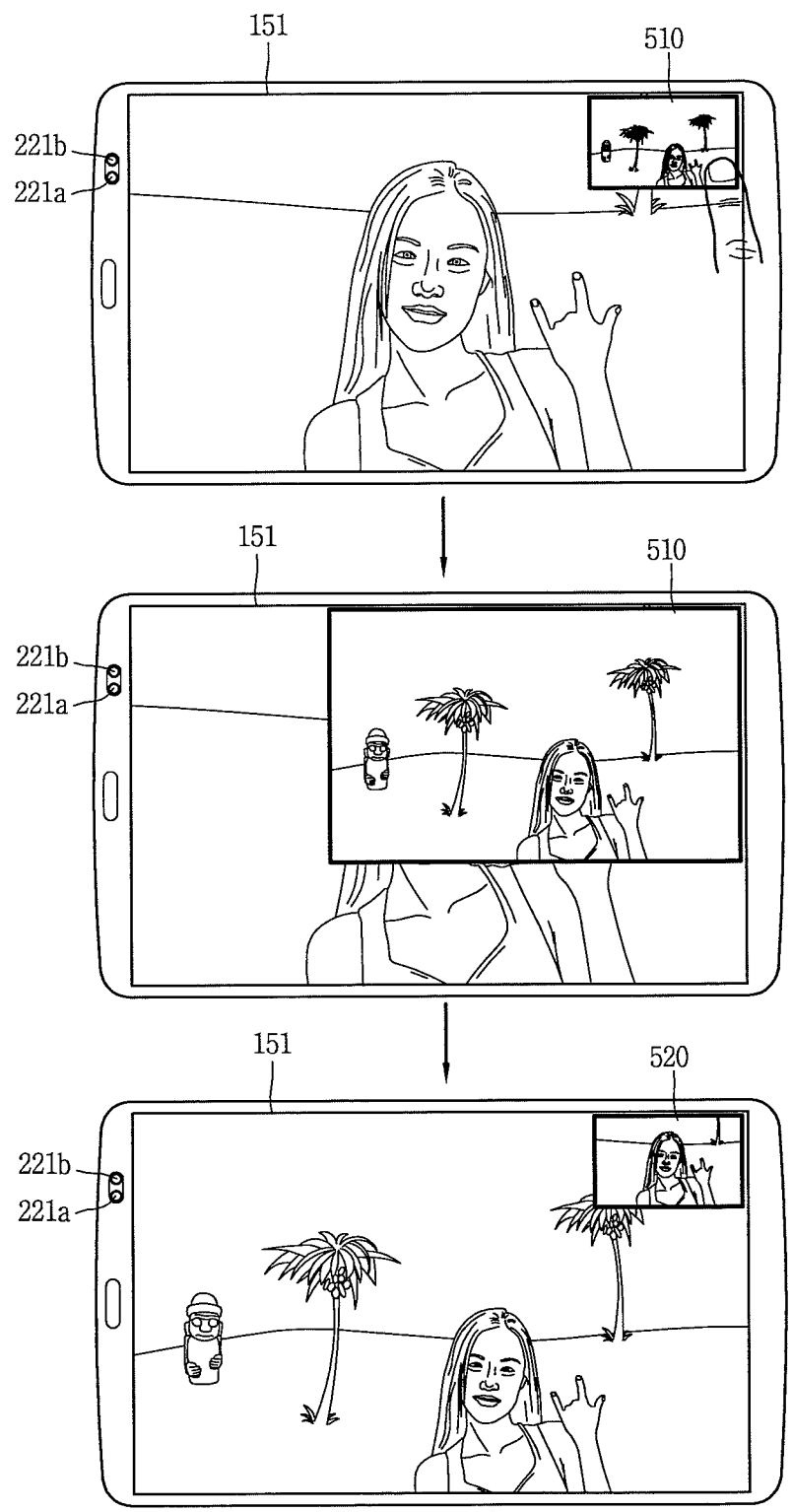

In this instance, as shown in the second drawing of FIG. 5A, the controller 180 can display the second image received from the second camera 221b and a thumbnail image of the first image received from the first camera 221a on the display 151. In another example, the controller 180 can give the thumbnail image an animation effect when switching from the first camera 221a to the second camera 221b. For example, as shown in FIG. 5B, if the thumbnail image 510 of the second image received from the second camera 221b is touched, an animation effect may be provided to gradually enlarge the thumbnail image 510.

Once the thumbnail image 510 is gradually enlarged and reaches a preset size, the controller 180 can switch the main camera from the first camera 221a to the second camera 221b. Also, the second image received from the second camera 221b and the thumbnail image 520 of the first image received from the first camera 221 may be displayed on the display 151. Moreover, the controller 180 can execute different functions associated with a thumbnail image based on different types of touch on the thumbnail image.

The different types of touch may include a flick, long touch, short touch, multi-touch, double-touch, etc. The different functions associated with the thumbnail image include causing the thumbnail image to disappear from the display 151, activating the camera corresponding to the thumbnail image, resizing the thumbnail image, etc.

For example, as shown in FIG. 6A, if the first camera 221a is set as the main camera and the second camera 221b is set as the sub camera, the controller 180 can sense a preset type of touch on the thumbnail image while the first image received from the first camera 221a and the thumbnail image 510 of the second image received from the second camera 221b are displayed on the display 151. The preset type of touch may include flicking from the left to the right.

Figure 6B:
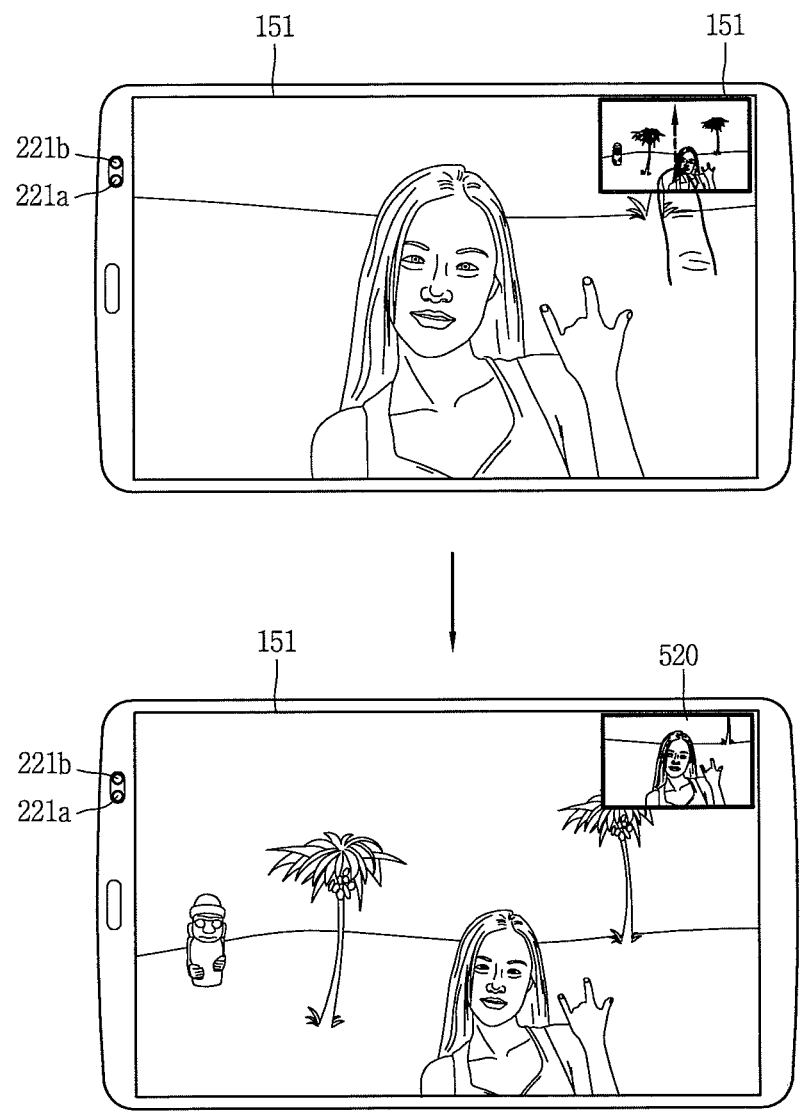

In this instance, the controller 180 can cause the thumbnail image 510 to disappear from the display 151. Thus, the user may view the first image, without it being hidden by the thumbnail image 510. In another example, as shown in FIG. 6B, if the first camera 221a is set as the main camera and the second camera 221b is set as the sub camera, the controller 180 can switch the main camera from the first camera 221a to the second camera 221b by flicking upward on the thumbnail image 510, while the first image received from the first camera 221a and the thumbnail image 510 of the second image received from the second camera 221b are displayed on the display 151.

Also, the controller 180 can switch the first camera 221a from the main camera to the sub camera. In this instance, the controller 180 can display the second image received from the second camera 221a and the thumbnail image 520 of the first image received from the first camera 221a on the display 151.

In the above, the method of switching the main camera through a thumbnail image has been described. Also, the controller 180 can automatically switch the main camera through an image recognition algorithm. The controller 180 can select a camera more suitable for image capture from between the first and second cameras 221a and 221b having different angles of view through the image recognition algorithm, and set the selected camera as the main camera so that images are captured through the image recognition algorithm. The image recognition algorithm is an algorithm that analyzes facial features in an image, and various algorithms that were conventionally developed may be used as the image recognition algorithm.

Figure 7:
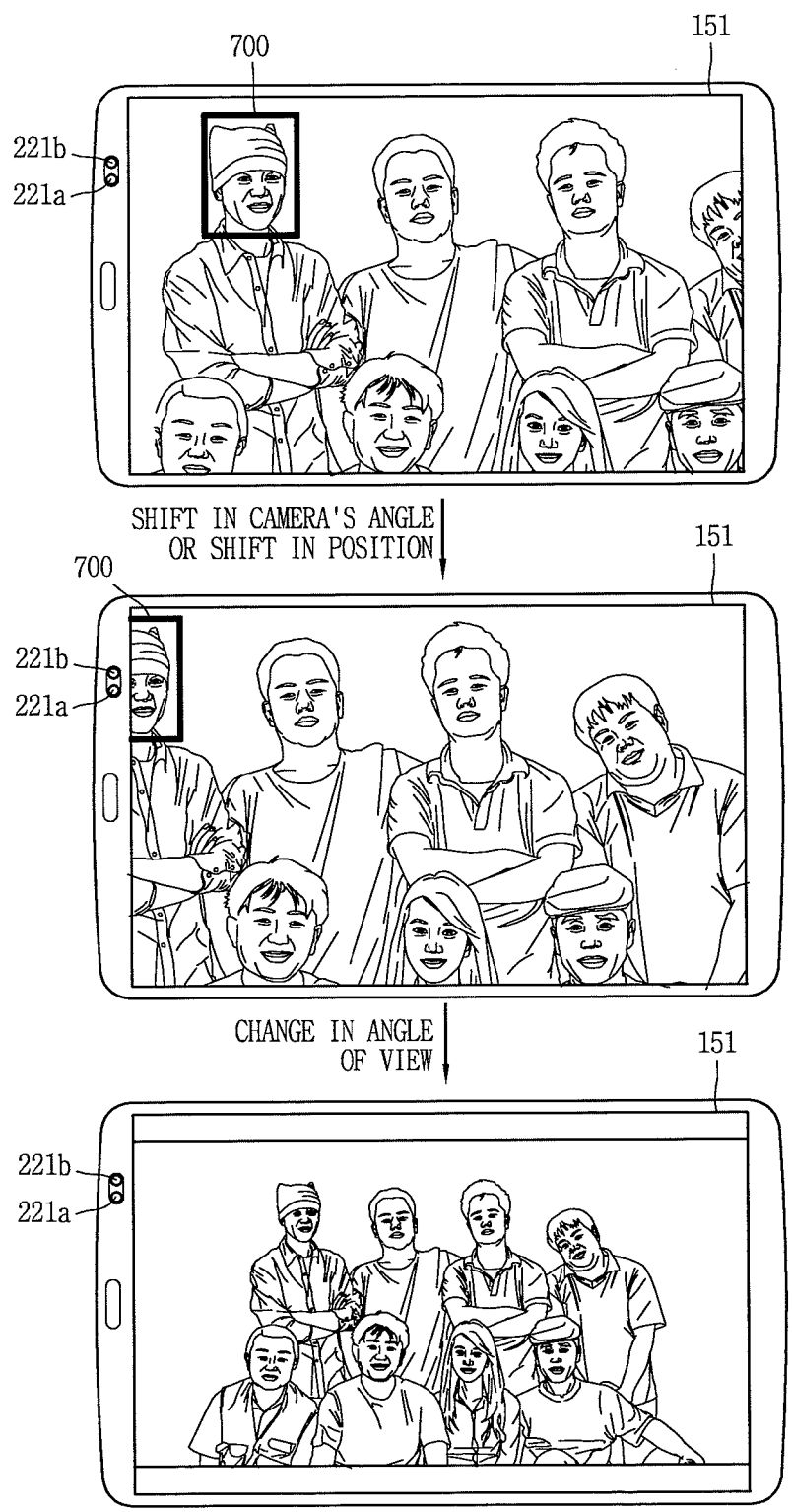

For example, as shown in the first drawing of FIG. 7, if the first camera 221a is set as the main camera, the controller 180 can display the first image received from the first camera 221a on the display 151. In this instance, the controller 180 can analyze the first image received from the first camera 221a through the image recognition algorithm. The image recognition algorithm analyzes images, and may include a facial recognition algorithm, for example.

For instance, the controller 180 can detect at least one face object included in the first image, based on a face recognition algorithm. Then, the controller 180 can determine whether the first camera 221a's angle of view is appropriate or not, based on the detected face object. More specifically, if the whole part of the at least one face object is successfully recognized, the controller 180 can determine the first camera 221a's angle of view as appropriate. Also, if some part of the at least one face object fails to be successfully recognized, the controller 180 can determine the first camera 221a's angle of view as inappropriate.

Successful recognition of the face object means that the recognized face object is within the first camera 221a's angle of view, whereas a failure to successfully recognize the face object means that at least part of the recognized face object is out of the first camera 221a's angle of view. For example, referring to the first drawing of FIG. 7, if a first face object 700 among a plurality of face objects included in the first image is successfully recognized, the controller 180 can determine the first camera 221a's angle of view as appropriate.

In this instance, the controller 180 can alter the first image received from the first camera 221a as the camera is moved by the user or the subject's position is shifted. In this instance, the controller 180 can determine whether the first camera 221a's angle of view is appropriate for the altered first image or not, through the face recognition algorithm.

In addition, referring to the second drawing of FIG. 7, if the first face object 700 fails to be successfully recognized, the controller 180 can determine the first camera 221a's angle of view as inappropriate. That is, if the image received from the first camera 221a is altered as the camera is moved by the user or the subject's position is shifted, the controller 180 can determine in real time whether the main camera's angle of view is appropriate or not.

If the first camera 221a's angle of view is determined as inappropriate, the controller 180 can switch the main camera. That is, the controller 180 can switch the main camera from the first camera 221a to the second camera 221b with a wider angle of view. In this instance, as shown in the third drawing of FIG. 7, if the main camera is switched to the second camera 221b, the controller 180 can display the second image received from the second camera 221b on the display 151 so the second image can be captured.

Further, the controller 180 can switch the main camera from the second camera 221b to the first camera 221a, based on the face recognition algorithm. For example, if the size of a face object in the image received from the second camera 221b has a preset value or less, the controller 180 can switch the main camera from the second camera 221b to the first camera 221a. As such, the present invention allows for better facial recognition through the first camera 221a having a narrower angle of view than the second camera 221b.

The present invention enables automatic switching of cameras by analyzing images received from the cameras in real time and determining an appropriate angle of view. Thus, the user can capture images through a camera with an appropriate angle of view, even without a control command.

Alternatively, the controller 180 can switch the main camera through a voice command. For example, as shown in the first drawing of FIG. 8, with the first and second cameras 221a and 221b set as the main camera, the controller 180 can display the first image and the second image on the display 151. Alternatively, with the second camera 221b set as the main camera, the controller 180 can display only the second image on the display 151. In this instance, as shown in the first drawing of FIG. 8, the controller 180 can detect the same image as the first image received from the camera 221a from the second image, and display a graphical object of the detected image as well.

Figure 8:
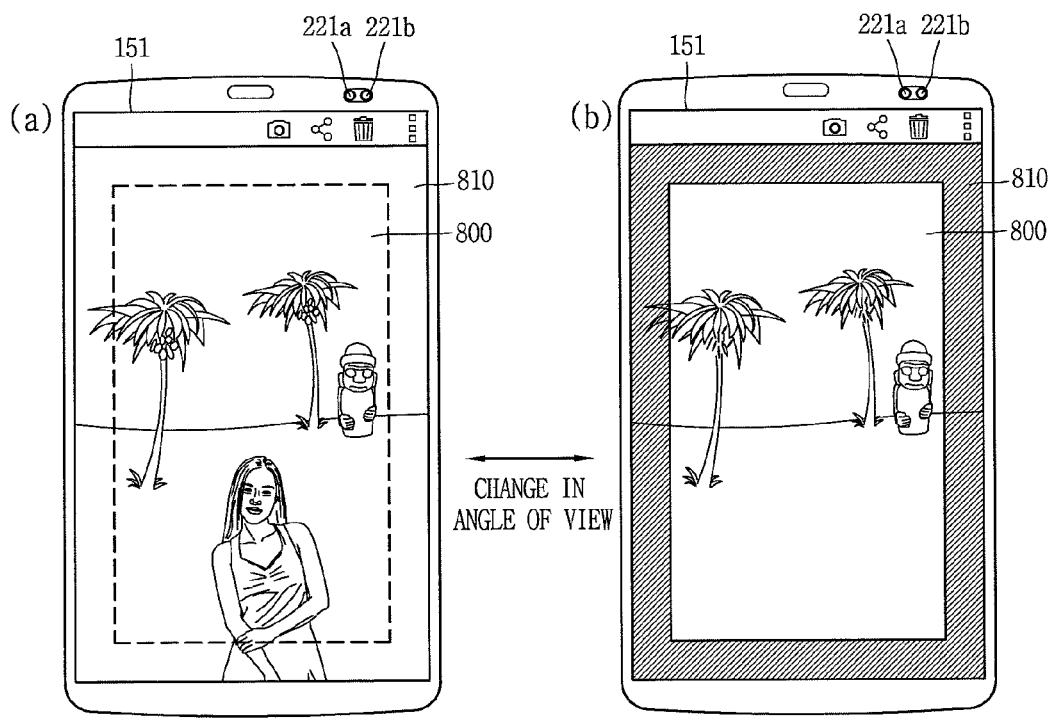

In addition, as shown in the second drawing of FIG. 8, upon receiving a voice saying "narrow", the controller 180 can switch the second camera 221b to the sub camera and display only the first image received from the first camera 221a on the display 151. In addition, upon receiving a voice saying "dual" while only the first image is displayed, the controller 180 can reset the first and second cameras 221a and 221b as the main camera, and the first and second images may be displayed again on the display 151.

Further, upon receiving a voice saying "wide" while only the first image is displayed, the controller 180 can switch the main camera to the second camera 221b and display the second image on the display 151. When displaying the first and second images together on the display 151, the controller 180 can detect a part of the second image corresponding to the first image and display a guide image for this part. The part corresponding to the first image is the same image as the first image.

For example, as shown in the first drawing of FIG. 8, the controller 180 can display a guide image 800 so the part of the second image corresponding to the first image is displayed. Through the guide image, the user can predict an image that can be captured in case of camera switching, before they actually switch between cameras.

In the above, the method of switching the main camera between the first and second cameras has been described with reference to FIGS. 4A to 8. In this instance, the present invention allows for switching the main camera so it has a focal point preset for each camera in case of camera switching, as explained with reference to FIG. 3C.

Hereinafter, a method of capturing images through first and second cameras will be described. In particular, FIGS. 9A to 12 are conceptual diagrams showing a method of capturing images through first and second cameras. A mobile terminal according to an embodiment of the present invention may be equipped with first and second cameras 221a and 221b. Thus, the mobile terminal can capture images through at least one of the first and second cameras 221a and 221b.

In the foregoing description, a method of selecting a camera for image capture from between the first and second cameras 221a and 221b and switching the main camera to the selected camera has been described. Hereinafter, a method of capturing images through a camera set as the main camera will be described in more detail.

First, the controller 180 can capture images received from at least one of the first and second cameras 221a and 221b, depending on the position of a touch on the display 151. For example, as shown in FIG. 9A, if the first and second cameras 221a and 221b are set as the main camera, the controller 180 can display first and second images together on the display 151.

In addition, a part of the second image corresponding to the second image received from the second camera 221b may be detected from the display 151. The part corresponding to the first image may include the same image as the first image. In this instance, the controller 180 can display the first image over the part of the second image corresponding to the first image in an overlapping manner. Also, the controller 180 can display guide information indicating an overlap of the first and second images. As such, the present invention makes the first and second images visually distinctive to the user.

Figure 9A:
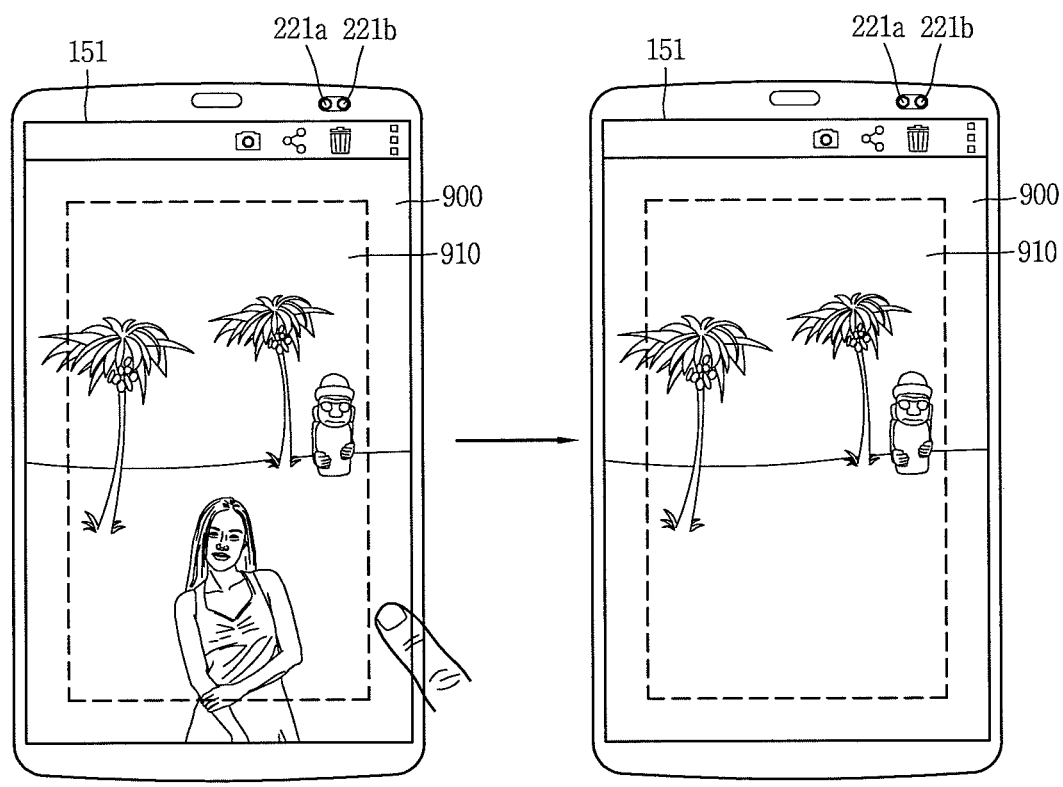

For example, as shown in FIG. 9A, the first image and the second image are displayed overlapping each other on the display 151, and a graphical object indicating an overlap of the first and second images may be displayed in dotted line. In this instance, the controller 180 can capture either a first area 900 corresponding to the second image or a second area 910 corresponding to the first image that is touched.

Figure 9B:
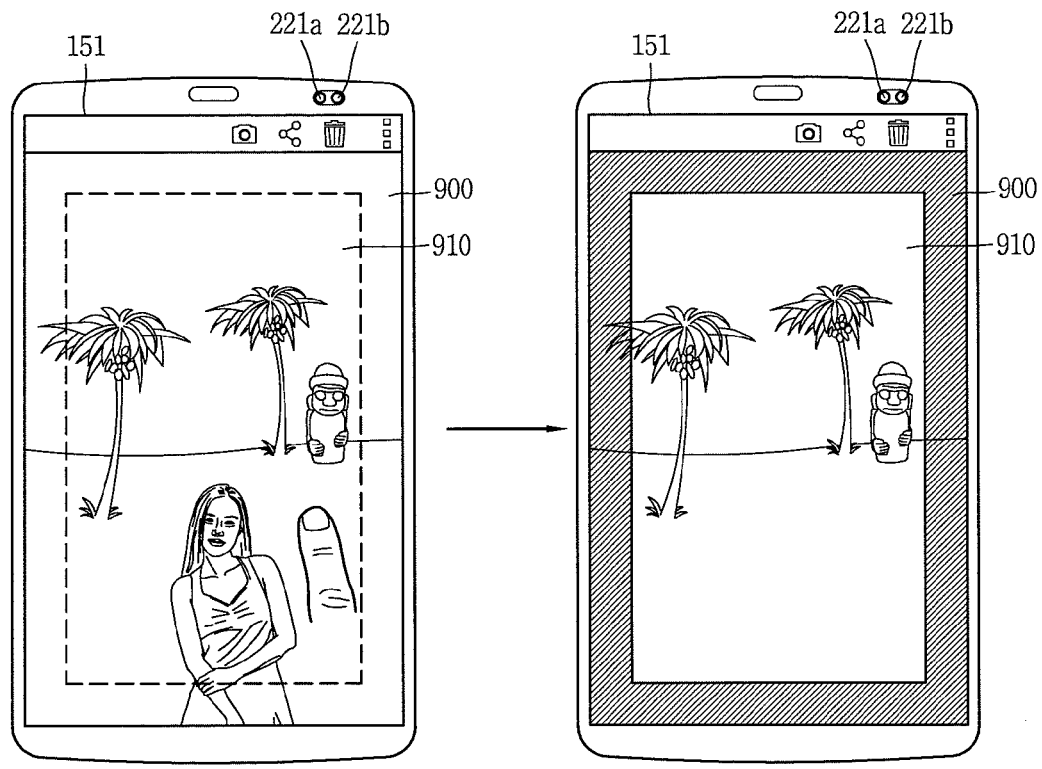

For example, as shown in FIG. 9A, the controller 180 can capture the second image received from the second camera 221b, in response to a touch on the first area 900 corresponding to the second image only. In another example, as shown in FIG. 9B, the controller 180 can capture the first image received from the first camera 221a, in response to a touch on the second area 910 corresponding to the first image.

Figure 9C:
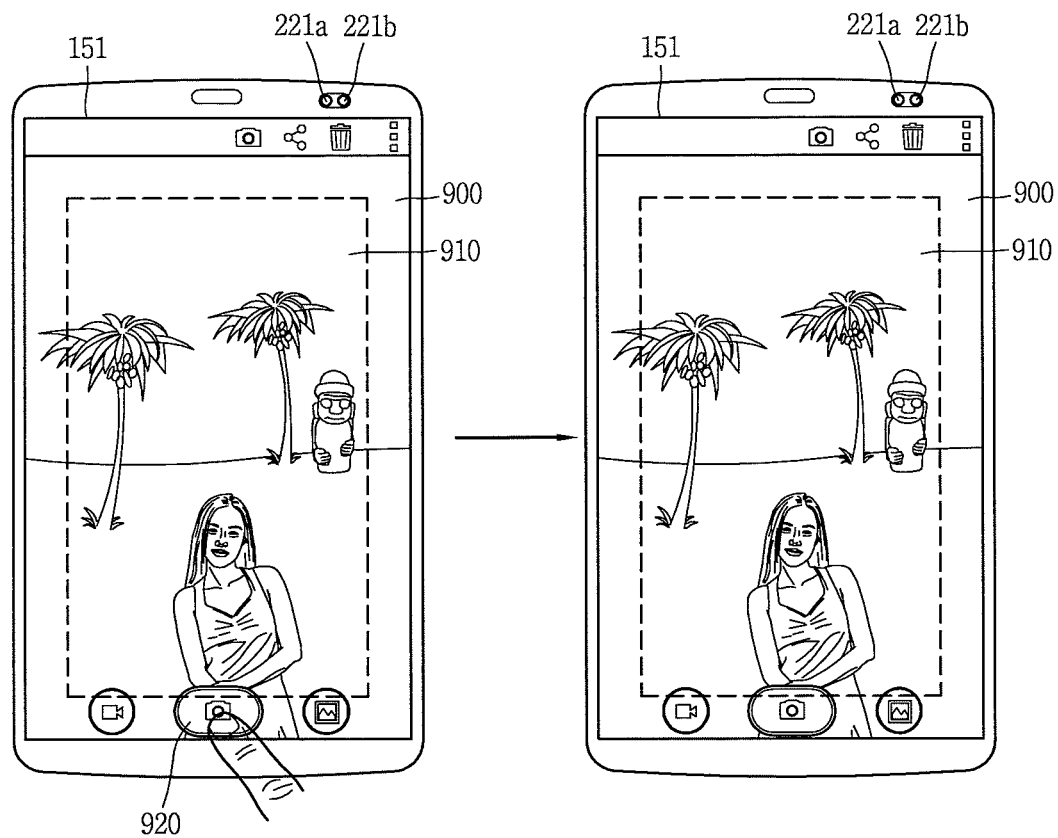

In still another example, the controller 180 can capture the first and second images received from the first and second cameras 221a and 221b, in response to a simultaneous touch on both the first area 900 corresponding to the second image and the second area 910 corresponding to the first image. Alternatively, as shown in FIG. 9C, the controller 180 can capture the first and second images simultaneously, in response to a touch on a graphical object 920 for receiving a capture command, while the first and second images are displayed together.

Alternatively, the controller 180 can capture images while sequentially switching between the first and second cameras. Upon receiving a capture request from the user to capture multiple images in succession, the controller 180 can sequentially capture the multiple images. When capturing the multiple images in succession, the controller 180 can sequentially capture the multiple images while switching the main camera according to a preset order. The preset order may be set by the user or arbitrarily by the controller 180.

For example, as shown in FIG. 10, the controller 180 can capture a first image through the first camera 221a and then a second image through the second camera 221b. Also, the controller 180 can capture a third image through the first camera 221a after capturing the second image. That is, the controller 180 can sequentially capture images while switching the main camera from the first camera 221a to the second camera 221b and then back to the first camera 221a.

Alternatively, the controller 180 can sequentially capture multiple images while switching the main camera in response to a user request. For example, the controller 180 can capture a first image through the first camera 221a. Thereafter, the controller 180 can switch the main camera to the second camera 221b based on a user request and capture an image through the second camera 221b. Also, the controller 180 can switch the main camera back to the first camera based on another request from the user, and capture images through the first camera 221*a*.

Accordingly, the user can capture images at different angles of view by a single control command. Alternatively, the controller 180 can sequentially capture multiple images by image analysis using an image recognition algorithm. That is, when capturing multiple images, the controller 180 can analyze images received in real time from the first and second cameras 221*a* and 221*b* and automatically set the main camera and capture images. The number of the multiple images may be set by the user.

Figure 11:
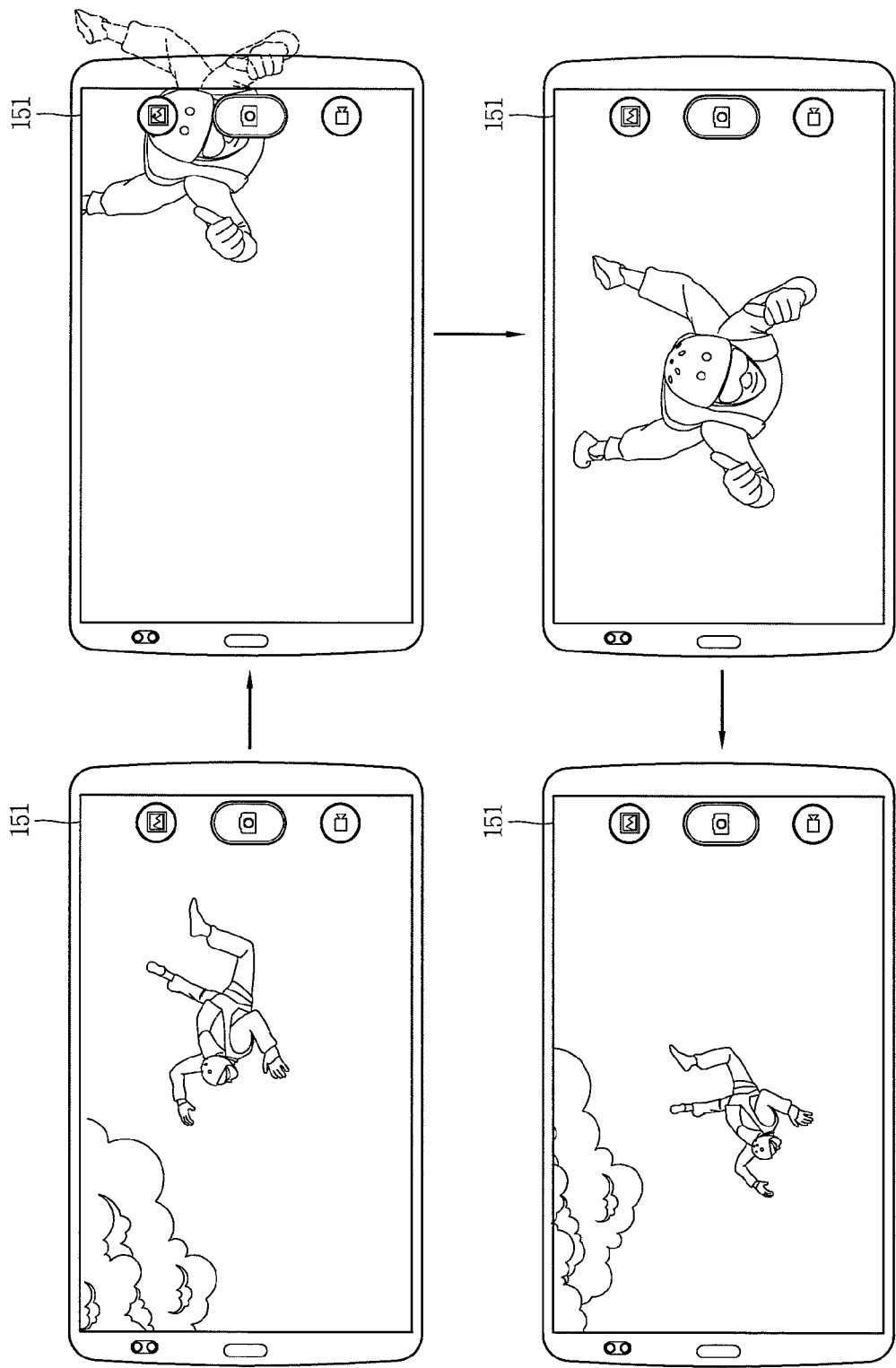
Figure 12:
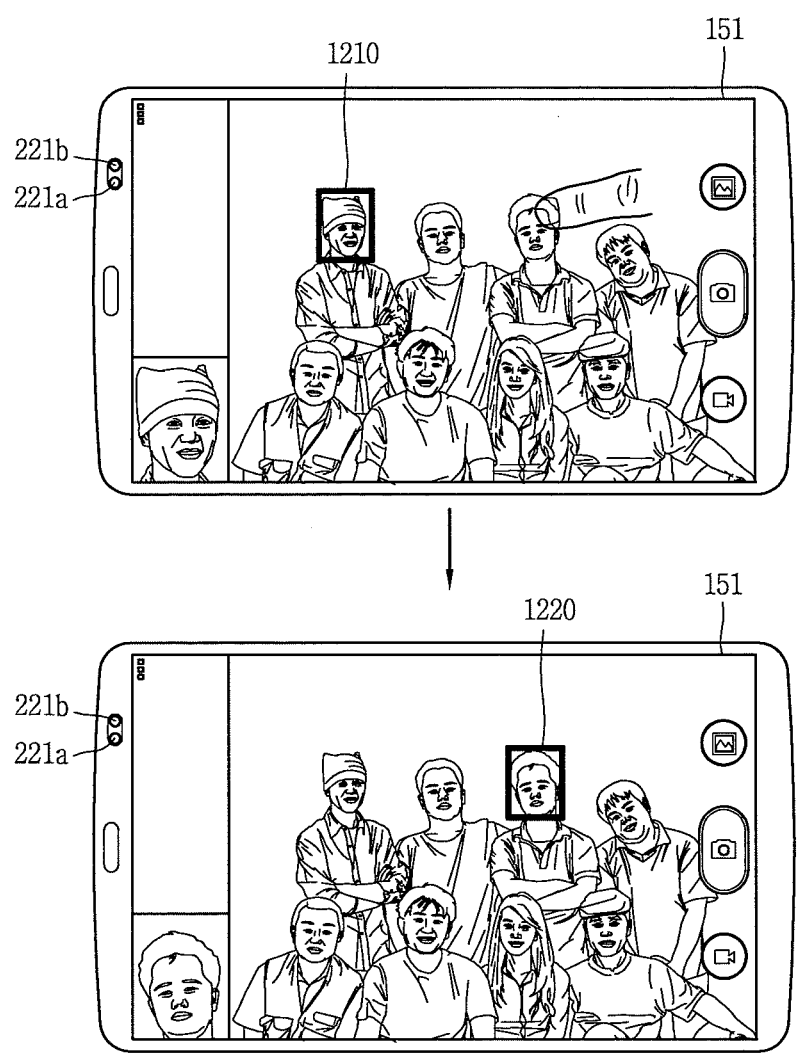

For example, as shown in the first drawing of FIG. 11, if the first camera 221*a* is set as the main camera, the controller 180 can capture a first image received from the first camera 221*a*. Then, as shown in the second drawing of FIG. 11, the controller 180 can analyze images received in real time from the first camera 221*a* through an image recognition algorithm, as explained above. If the result of the analysis of an image received from the first camera 221*a* shows that the first camera 221*a*'s angle of view is inappropriate, the main camera may be switched from the first camera 221*a* to the second camera 221*b*.

In this instance, as shown in the third drawing of FIG. 11, the controller 180 can capture images through the second camera 221*b*. Then, the controller 180 can switch the main camera back to the first camera 221*a* after capturing images through the second camera 221*b*. That is, the controller 180 can temporarily switch the main camera to the second camera 221*b*. After switching the main camera, the controller 180 can capture images again through the first camera 221*a*, which is now the main camera.

Alternatively, as previously explained, the controller 180 can analyze the second camera 221*b* based on the image recognition algorithm. Then, the controller 180 can determine whether the second camera 221*b*'s angle of view is appropriate or not, based on the result of the analysis. For example, if the size of an object included in an image received from the second camera 221*b* has a preset value or less, the controller 180 can determine the second camera 221*b*'s angle of view as inappropriate.

Once the controller 180 determines the second camera 221*b*'s angle of view as inappropriate, the controller 180 can switch the main camera back to the first camera 221*a*. Then, as shown in the fourth drawing of FIG. 11, the controller 180 can capture an image received from the first camera 221*a*.

Thus, the present invention allows for capturing multiple images at an appropriate angle of view, without a control command from the user. Moreover, the controller 180 can capture images simultaneously through the first and second cameras 221*a* and 221*b*. In this instance, the controller 180 can decide which images to capture through the first and second cameras 221*a* and 221*b*.

More specifically, the controller 180 can capture a full image of a subject through the second camera 221*b* with a wide angle of view and a partial image of the subject through the first camera 221*a* with a narrow angle of view. For example, as shown in the first drawing of FIG. 12, the controller 180 can receive an image of a subject from the second camera 221*b* and display the received image on the display 151. In this instance, the controller 180 can receive at least part of the image received from the second camera 221*b* through the first camera 221*a*. The at least part of the image may be an image that is displayed in an area 1210 where the second camera 221*b*'s focus is.

Also, the controller 180 can alter an image received from the first camera 221*a* based on a user request. For example, as shown in the second drawing of FIG. 12, the controller 180 can sense a touch on an image received from the second camera 221*b*. In this instance, the controller 180 can control the first camera 221*a* so that an image displayed in a touched area 1220 is received from the first camera 221*a*.

As such, the present invention allows for simultaneous capture of full and partial images of a subject through cameras configured to capture images at different angles of view. In the above, the method of capturing images through first and second cameras having different angles of view and configured to capture images have been described.

Figure 13:
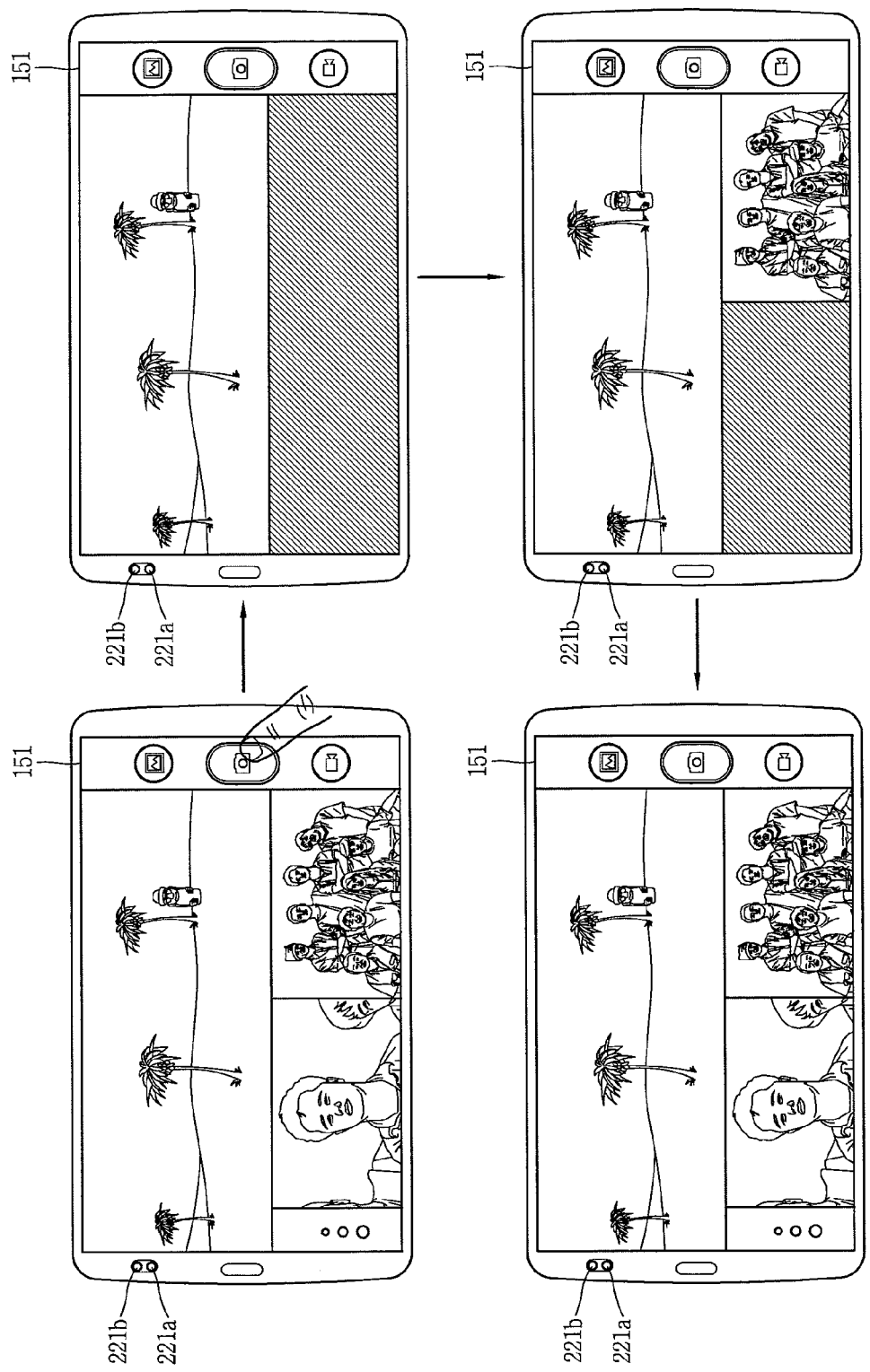
FIGS. 13 and 14 are conceptual diagrams showing a method of capturing images through first and second cameras having different angles of view and fitted to the front side of a mobile terminal according to an embodiment of the present invention and a third camera fitted to the back side of the mobile terminal.
Figure 14:
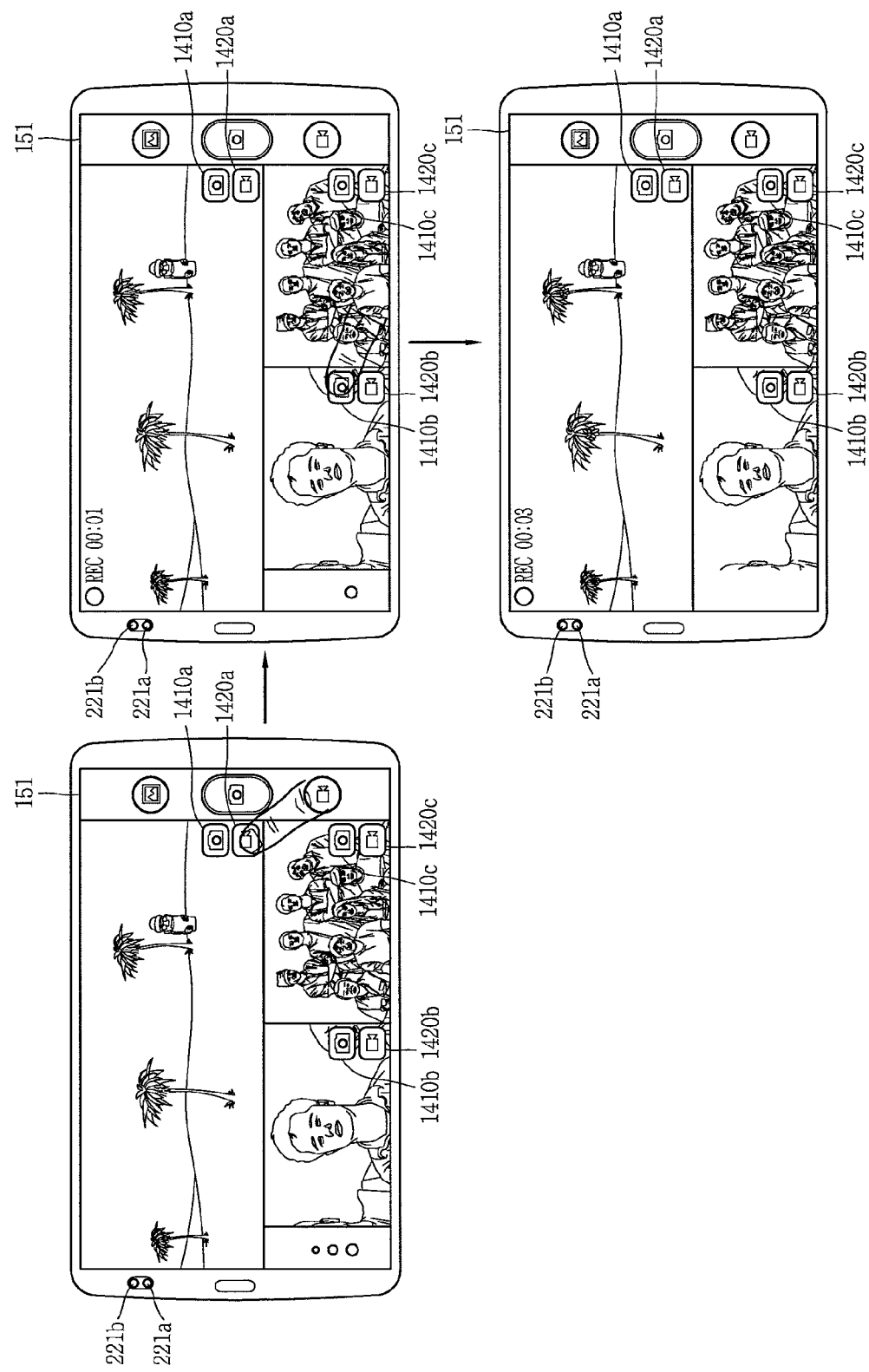

Hereinafter, a method of capturing images through first and second cameras having different angles of view and fitted to the front side of a mobile terminal according to an embodiment of the present invention and a third camera fitted to the back side of the mobile terminal will be described. FIGS. 13 and 14 are conceptual diagrams showing a method of capturing images through first and second cameras having different angles of view and fitted to the front side of a mobile terminal according to an embodiment of the present invention and a third camera fitted to the back side of the mobile terminal.

A mobile terminal according to an embodiment of the present invention may be equipped with first and second cameras 221*a* and 221*b* having different angles of view and fitted to the front side of a mobile terminal according to an embodiment of the present invention and a third camera 121*b* fitted to the back side of the mobile terminal.

In this instance, the controller 180 can capture images at different angles of view or in different directions, simultaneously or sequentially through the multiple cameras. Also, the controller 180 can display multiple images received from the multiple cameras together on the display 151. More specifically, the controller 180 can divide the display 151 into multiple areas and display multiple images in the multiple areas, respectively. For example, as shown in the first drawing of FIG. 13, the controller 180 can display a first image in a first area, a second image in a second area, and a third image in a third area. In this instance, a graphical object for receiving an image capture request may be further displayed on the display 151.

Moreover, as shown in the first drawing of FIG. 13, when the graphical object for receiving a capture request is touched, the controller 180 can sequentially capture images received from the multiple cameras. For example, the controller 180 can capture images through the third camera 121*b* on the back side, then the second camera 221*b*, and then the first camera 221*a*. This order may be changed arbitrarily by the user.

Additionally, as shown in the second, third, and fourth drawings of FIG. 13, when images are capture sequentially, the controller 180 can display the captured images on the display 151 in the order they are captured, so as to indicate that the images are sequentially captured. Further, the controller 180 can capture the images received from the multiple images simultaneously.

Also, the controller 180 can control the multiple cameras individually. More specifically, the controller 180 can control the multiple cameras so still images are captured through at least part of the multiple cameras and videos are captured through the other cameras. Thus, the controller 180 can display a graphical object for still image capture and a graphical object for video capture over the images received from the respective cameras. Accordingly, the user can control the multiple cameras individually through the respective graphical objects.

For example, as shown in the first drawing of FIG. 14, the controller 180 can display an image received from the third camera 121*b* on the back side in a first area, an image received from the first camera 221*a* in a second area, and an image received from the second camera 221*b* in a third area.

Also, the controller 180 can display graphical objects 1410*a*, 1410*b*, and 1410*c* for still image capture and graphical objects 1420*a*, 1420*b*, and 1420*c* for video capture in the respective areas. In this instance, as shown in the first drawing of FIG. 14, the controller 180 can capture a video of the image received from the first camera 221*a*, in response to a touch on the graphical object 1410*b* for still image capture displayed in the second area.

Accordingly, embodiments of the present invention allows for simultaneous capture of still images and videos through multiple cameras. Embodiments of the present invention allows for capture of various types of images through at least two cameras with different angles of view. Moreover, embodiments of the present invention enables quick capture by using preset focal points when capturing through at least two cameras with different angles of view. In addition, embodiments of the present invention enables capturing of images at an appropriate angle of view by recognizing the images through an image recognition algorithm.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

What is claimed is:

1. A mobile terminal, comprising:
a camera including a first camera and a second camera;
a touch screen; and
a controller configured to:
cause the touch screen to display a first preview image being received from the first camera with a first focal length,
detect at least one facial object included in the first preview image,
cause the touch screen to display a second preview image, being received from the second camera with a second focal length shorter than the first focal length, including the at least one facial object based on the detection with respect to the at least one facial object,
execute different functions for different images to which a preset type of touch is applied, wherein the preset type of touch includes a pinch-in touch and a pinch-out touch,
when the pinch-in touch is applied to the first preview image while the first preview image is displayed on the touch screen, switch a main camera from the first camera with the first focal length to the second camera with the second focal length,
when the pinch-in touch is applied to the second preview image while the second preview image is displayed on the touch screen, display the first preview image and the second preview image together,
set both the first camera with the first focal length and the second camera with the second focal length as the main camera and capture the first preview image and the second preview image when the pinch-out touch is applied to the first preview image while the first preview image is displayed on the touch screen, and
when performing a camera switching function by the pinch-in touch or the pinch-out touch, control not to zoom-in or zoom-out the first preview image in response to the pinch-in touch or the pinch-out touch.

2. The mobile terminal of claim 1, wherein the controller is further configured to display the first preview image on the touch screen together with a thumbnail image corresponding to the second preview image on the touch screen.

3. The mobile terminal of claim 2, wherein the controller is further configured to display the second preview image together with a thumbnail image corresponding to the first preview image on the touch screen, in response to a preset type of touch on the thumbnail image of the second image.

4. The mobile terminal of claim 1, wherein the controller is further configured to capture the first and second images corresponding to the first and second preview images respectively received from the camera sequentially or simultaneously, upon receiving an image capture request.

5. The mobile terminal of claim 4, wherein the controller is further configured to sequentially capture the first and second images corresponding to the first and second preview images respectively through the camera to a preset order.

6. The mobile terminal of claim 1, wherein each display size corresponding to the at least one facial image in the second preview image is smaller than the each display size of the at least one facial object in the first preview image.

7. The mobile terminal of claim 1, wherein the controller is further configured to detect facial features of the at least one facial object and display the second preview image based on the facial features being satisfied with a preset condition related to the at least one facial object.

8. The mobile terminal of claim 1, wherein the controller is further configured to display the second preview image when a part of the at least one facial object is not included in the first preview image.

9. The mobile terminal of claim 1, wherein the first preview image corresponds to a first angle of view of the camera and the second preview corresponds to a second angle of view of the camera, the second angle of view being wider than the first angle of view.

10. The mobile terminal of claim 1, wherein the controller is further configured to detect the at least one facial object based on a facial recognition algorithm with respect to the first preview image.

11. The mobile terminal of claim 1, wherein the controller is further configured to:
when the second preview image is displayed on the touch screen, detect one or more facial objects included in the second preview image, and
cause the touch screen to display the first preview image based on the detection with respect to the one or more facial objects.

12. A method of controlling a mobile terminal having a camera, the camera including a first camera and a second camera, the method comprising:
displaying, on a touch screen, a first preview image being received from the first camera with a first focal length;
detecting at least one facial object included in the first preview image;
displaying, on the touch screen, a second preview image, being received from the second camera with a second focal length shorter than the first focal length, including the at least one facial object based on the detection with respect to the at least one facial object;

executing different functions for different images to which a preset type of touch is applied, wherein the preset type of touch includes a pinch-in touch and a pinch-out touch;

when the pinch-in touch is applied to the first preview image while the first preview image is displayed on the touch screen, switching a main camera from the first camera with the first focal length to the second camera with the second focal length;

when the pinch-in touch is applied to the second preview image while the second preview image is displayed on the touch screen, displaying the first preview image and the second preview image together;

setting both the first camera with the first focal length and the second camera with the second focal length as the main camera and capture the first preview image and the second preview image when the pinch-out touch is applied to the first preview image while the first preview image is displayed on the touch screen; and when performing a camera switching function by the pinch-in touch or the pinch-out touch, controlling not to zoom-in or zoom-out the first preview image in response to the pinch-in touch or the pinch-out touch.

13. The method of claim 12, wherein a request to obtain the second preview image corresponds to a preset type of touch while the first preview image is displayed on the touch screen.

14. The method of claim 12, further comprising:
displaying, via the touch screen, the first preview image together with a thumbnail image of the second preview image.

15. The method of claim 12, wherein each display size corresponding to the at least one facial image in the second preview image is smaller than the each display size of the at least one facial object in the first preview image.

16. The method of claim 12, further comprising:
detecting facial features of the at least one facial object and displaying the second preview image based on the facial features being satisfied with a preset condition related to the at least one facial object.

17. The method of claim 12, wherein the second preview image is displayed when a part of the at least one facial object is not included in the first preview image.

18. The method of claim 12, wherein the first preview image corresponds to a first angle of view of the camera and the second preview corresponds to a second angle of view of the camera, the second angle of view being wider than the first angle of view.

19. The method of claim 12, further comprising:
detecting the at least one facial object based on a facial recognition algorithm with respect to the first preview image.

20. The method of claim 12, further comprising:
when the second preview image is displayed on the touch screen, detecting one or more facial objects included in the second preview image; and
displaying the first preview image based on the detection with respect to the one or more facial object.

* * * * *